United States Patent [19]

Marshall et al.

[11] Patent Number: 4,868,784
[45] Date of Patent: Sep. 19, 1989

[54] MICROCOMPUTER WITH A MULTI-CHANNEL SERIAL PORT HAVING A SINGLE PORT ADDRESS

[75] Inventors: Steven P. Marshall, Missouri City; Edward N. Caudel, Fort Worth; Michele Stone, Stephenville; Margaret D. McNeely, Fort Worth, all of Tex.

[73] Assignee: Texas Instruments Incorporated, Dallas, Tex.

[21] Appl. No.: 927,883

[22] Filed: Nov. 6, 1986

Related U.S. Application Data

[60] Continuation-in-part of Ser. No. 841,123, Mar. 18, 1986, Pat. No. 4,688,073, which is a division of Ser. No. 350,852, Feb. 22, 1982, Pat. No. 4,577,282.

[51] Int. Cl.$^4$ .............................................. G06F 9/00
[52] U.S. Cl. ................................ 364/900; 364/945.9; 364/933; 364/925.5
[58] Field of Search ... 364/200 MS File, 900 MS File

[56] References Cited

U.S. PATENT DOCUMENTS 4,354,225  10/1982  Frieder et al. .................... 364/200
4,527,250   7/1985  Galdun et al. .................... 364/900

*Primary Examiner*—Gareth D. Shaw
*Assistant Examiner*—John G. Mills
*Attorney, Agent, or Firm*—Melvin Sharp; N. R. Merrett; Rodney M. Anderson

[57] ABSTRACT

A microcomputer having a dual-channel serial port is disclosed, where both channels of the serial port have the same addressable location. On the transmit side of the serial port, two data words are sequentially written to a two stage first-in first-out memory from the data bus of the microcomputer, when the serial port is addressed. At such time as a frame of data is to be transmitted, the framing signal causes the contents of the two stages of the first-in first-out memory to be loaded into separate transmit shift registers, for serial transmission from the pair of serial output terminals. On the receive side of the serial port, a pair of shift registers each receive serial data at the serial input terminals; at the end of the data frame, the contents of the shift registers are loaded into intermediate receive registers. The contents of the intermediate receive registers are multiplexed onto the data bus, responsive to a read instruction addressing the serial port. Encoding and decoding hardware is provided which allows the data to be selectively companded according to the micro-255 law or to the A law, both prior to transmission and after receipt.

11 Claims, 8 Drawing Sheets

MICROCOMPUTER WITH A MULTI-CHANNEL SERIAL PORT HAVING A SINGLE PORT ADDRESS

This is a continuation-in-part of application Ser. No. 841,123, filed Mar. 18, 1986, now U.S. Pat. No. 4,688,073 which is a divisional of application Ser. No. 350,852, filed Feb. 22, 1982, now U.S. Pat. No. 4,577,282.

BACKGROUND OF THE INVENTION

This invention relates to integrated semiconductor devices and systems, and more particularly to features of a high-speed, miniaturized, electronic digital signal processing system in single-chip microcomputer form.

A microprocessor device is a central processing unit or CPU for a digital processor which is usually contained in a single semiconductor integrated circuit or "chip" fabricated by MOS/LSI technology, as shown in U.S. Pat. No. 3,757,306 issued to Gary W. Boone and assigned to Texas Instruments. The Boone patent shows a single-chip 8-bit CPU including a parallel ALU, registers for data and addresses, an instruction register and a control decoder, all interconnected using the Von Neumann architecture and employing a bidirectional parallel bus for data, address and instructions. U.S. Pat. No. 4,074,351, issued to Gary W. Boone, and Michael J. Cochran, assigned to Texas Instruments, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage; the terms are also used interchangeably, however, and are not intended as restrictive as to some features of this invention.

In contrast, a special-purpose high-speed microcomputer device can be constructed which departs from these contemporary microprocessor devices in several major respects in order to achieve substantial speed and performance advantages. Such advantages are especially important in digital signal processing applications. This device is generally a non-microcoded processor using a modified Harvard architecture.

Data communication among such contemporary microprocessors and microcomputers, as well as among such microprocessors and microcomputers specially adapted for digital signal processing, can be accomplished either in parallel or serially. Parallel communication of digital data utilizes a plurality of data lines simultaneously communicating each of the binary digits in a data word, while serial communication utilizes a single data line which communicates the binary digits in the data word in a time sequence. Serial communication is highly utilized in telecommunications between computers, as the computers need not be utilize the same data word width (e.g., an eight bit computer may communicate with a sixteen bit computer), and communication may take place over existing telephone lines via modems or codecs. Of course, for serial communication to be performance competitive with parallel communication, the data rate of the individual bits must be quite high.

In order to increase the data rate of serial communication between computers, and in order to allow flexibility in such communication, full-duplex communication is useful; such full-duplex communication allowing a single computer system to transmit and receive data simultaneously. Dual-port serial communication further increases the data rate, since data words can be received or sent simultaneously over two serial data lines, effectively doubling the data rate as seen externally from the microprocessor or microcomputer.

In performing input and output functions, however, the central logic unit of a microprocessor generally must store data into (for output) or read data from (for input) dedicated locations; these dedicated locations are required for either serial or parallel input/output. In order to allow the microprocessor to perform such input and output to a plurality of input and output devices over a single data bus, the microprocessor must be able to address the desired device. For a microprocessor having both serial and parallel input and output, each serial port and each parallel port which is accessible via the data bus will necessarily have separate addresses. For a limited number of address pins which can be used to address external input and output devices, the number of such addresses is similarly limited. As a result, in order to maximize the input and output flexibility of a microprocessor while minimizing the number of terminals necessary to do so, it is desirable that the serial port occupy a single port address. Heretofore, however, in order to have multiple serial port channels for a microprocessor, multiple port addresses have been required.

It is evident that the benefits of a dual-channel serial port can thus be offset by the need to have additional port addresses for the additional serial channel. These additional locations not only present the programmer with fewer available input and output port addresses for external devices, but also presents reduced portability of the software between a microprocessor having a single-channel serial port and the dual-channel serial port microprocessor.

It is therefore an object of this invention to provide a multiple-channel serial port which utilizes only a single external port address.

It is a further object of this invention to provide such a multiple-channel microprocessor serial port which can easily be programmed to function as a single-channel serial port.

Other objects and advantages of the invention will be apparent to those skilled in the art having reference to this specification.

SUMMARY OF THE INVENTION

The invention may be incorporated into microprocessor serial output circuitry by providing a parallel-in serial-out register for each of the serial output terminals. A two stage first-in-first-out (FIFO) memory has each of its stages connected to one of the registers. The microprocessor provides data to the serial output terminals by sequentially writing two bytes of data to the external data bus in association with an address signal addressing the single addressable location identified as the serial port. Such a process writes the two bytes of data into the two stages of the FIFO. The contents of the of the stages of the FIFO are subsequently loaded into the associated registers, for serial output by the two serial output terminals. On the input side, two serial input data terminals receive serial input data, and load a pair of serial-in parallel-out registers. The microprocessor reads the addressable location associated with the serial port two successive times, with the contents of the registers successively placed on the microprocessor data bus, and received by the microprocessor.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF SPECIFIC EMBODIMENT

Microcomputer System

Figure 1:
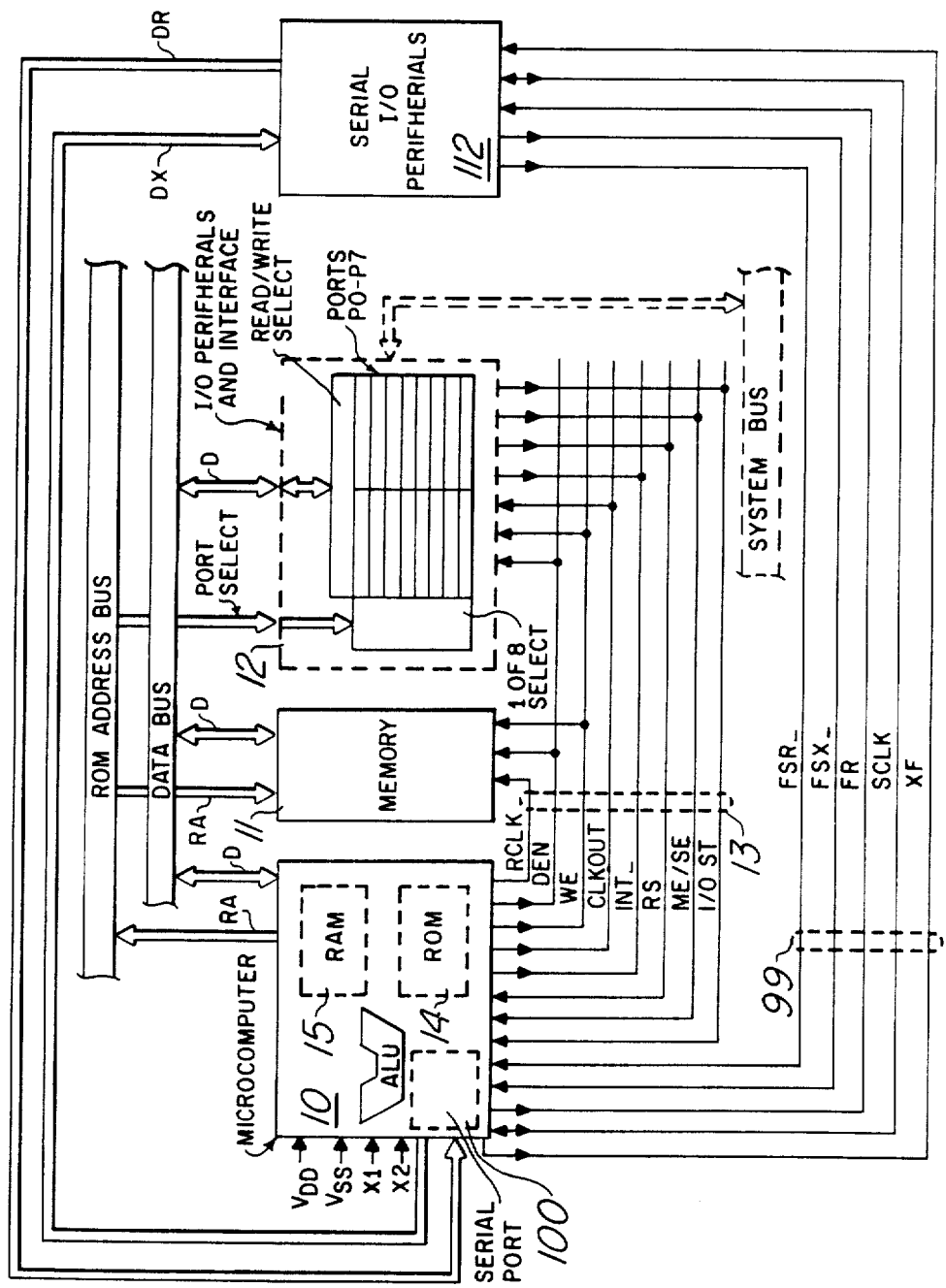
FIG. 1 is an electrical diagram in block form of a microcomputer system employing features of the invention.

The microcomputer device to be described herein is primarily used for signal processing, but concepts thereof may be used in processor devices of various configurations, and these devices may be used in many different systems; in one embodiment the microcomputer is used in a system shown in generalized form in FIG. 1. The system may be, for example, a voice communications system, a speech analysis system, a small "personal" or "home" computer, a single-board general purpose microcomputer, a word processing system, a computer terminal having local processing capability with display and typewriter keyboard, or any one of many applications of various types. The system includes a single-chip MOS/LSI central processing unit or microcomputer 10 which will be described in detail, along with a program or data memòry 11 and input/output or I/O devices 12. Usually the I/O devices 12 for the typical system include analog-to-digital and/or digital-to-analog converters, a modem, a keyboard, a CRT display, a disc drive, etc. Often the I/O 12 includes coupling to a general purpose processor; that is, the microcomputer 10 is an attached processor in a larger system with interface via the I/O 12. The microcomputer 10, program data memory 11 and I/O 12 communicate with one another by two multibit, parallel address and data busses, D and RA; along with a control bus 13.

Serial I/O peripheral 112 communicates with microcomputer 10 not by way of data bus D, but by way of serial transmit bus DX and serial receive bus DR to serial port 100. Serial I/O peripheral 112 can be any device which is responsive to serial data, or which provides serial data, or both; a common device is a codec (coder/decoder), as used in telecommunication applications. Serial transmit bus DX and serial receive bus DR can have any number of channels, or parallel data lines, over which serial data can be communicated. As will be described in greater detail below, the invention is directed to the situation where two or more serial data channels are used, with the preferred embodiment described where serial transmit bus DX and serial receive bus DR each have two channels. As shown in FIG. 1, serial control bus 99 also links microcomputer 10 with serial I/O peripheral 112; as in the case of control bus 13, the signals in serial control bus 99 control communication of data between the two devices. In the case of serial I/O peripheral 112, serial clock SCLK is either an input to, or an output from microcomputer 10; the purpose of serial clock SCLK is the serial clock pulse which serially clocks data along serial transmit bus DX and serial receive bus DR. Internal framing signal FR is an output from microcomputer 10 which serial I/O peripheral 112 can use to synchronize itself with serial port 100 of microcomputer 10, when the user wishes microcomputer 10 to control synchronization of the serial transmission. External receive framing signal FSR_ is an input to microcomputer 10 from serial I/O peripheral 112 which serial I/O peripheral 112 uses, in transmitting serial data to microcomputer 10, to synchronize the receipt of such data with the transmission from serial I/O peripheral 112, when the user wishes serial I/O peripheral 112 to control synchronization of the serial transmission. Similarly, when serial I/O peripheral 112 controls synchronization of the serial transmission, external transmit framing signal FSX_ is input by serial I/O peripheral 112 to microcomputer 10. It should be noted that framing signals FSR_ and FSX_ are active low, as indicated by the "_" indicator in their signal designation. Each of the framing pulses FR, FSR_ and FSX_ serve to indicate the beginning of a byte of data (eight serial bits). External flag XF serves merely as a user-programmable flag bit.

The microcomputer 10 has suitable supply voltage and clock input terminals; for example, the device employs a single +5 V Vdd supply and ground or Vss, and a crystal may be connected to terminals X1 and X2 of the device 10 to control certain system timing. The microcomputer 10 is a very high speed device with a crystal input of 20 MHz, providing an instruction execution rate of five million per second, in one embodiment. Alternatively, an externally generated clock signal of up to 20 MHz may be applied to the X2 input to control such timing, in lieu of a crystal connected between X1 and X2. Clock signal CLKOUT is generated by microcomputer 10, derived from the crystal connected between terminals X1 and X2, or derived from the externally generated clock signal applied to terminal X2, and has a frequency which is a fraction of said crystal input or said externally generated clock signal. The frequency ratio of clock signal CLKOUT to the crystal (or external clock) determines the number of phases within each cycle of clock signal CLKOUT; for example if clock signal CLKOUT is at a frequency one-fourth that of the input clock signal (crystal or externally generated), each cycle of clock signal CLKOUT can be considered to have four phases, one phase for each of the cycles of the input signal within each cycle of clock signal CLKOUT. Clock signal CLKOUT appears on control bus 13, for synchronization of I/O devices 12.

The microcomputer device 10 is a general purpose microcomputer specifically aimed at serving a large class of serial signal processing problems such as digital filtering, signal handling for telecommunications modems (modulation, demodulation), data compression for linear predictive code (LPC) speech signals, fast Fourier transforms, and in general for virtually all computation intensive analog system functions, including detection, signal generation, mixing, phase tracking, angle measurement, feedback control, clock recovery correlation, convolution, etc. It is suitable for applications which have computational requirements similar to those for control and signal processing, such as coordinate transformation, solution of linear differential equations with constant coefficients, averaging, etc. The device 10 is usually interfaced via I/O 12 to a general purpose processor such as a 99000, an 8600 or a 68000, to construct processing systems as will be explained.

It is understood that, even though described in the context of a microcomputer in the preferred embodiment, with an on-chip program ROM 14 and data RAM 15, nevertheless some concepts of the invention may be used in a single-chip microprocessor with all off-chip program memory and/or data memory instead of the on-chip memory illustrated. Indeed, modes of operation are provided which disable the on-chip memory. Also, a microcomputer is shown having two separate external program address and data busses instead of the multiplexed, bidirectional busses which are now common, but some features herein disclosed are applicable where busses are multiplexed. The advantage of separating the busses and separating program and data memory space is speed.

In general terms, the system of FIG. 1 functions in the following manner: the microcomputer 10 fetches an instruction word internally by accessing the ROM 14 or externally by sending out an address on the ROM address bus RA to the memory 11 (and RCLK_ on control bus 13). If external, the instruction word is received back via the data bus D from the addressed location in the memory 11. This instruction is executed in the next machine cycle) of length of 200 ns defined by a 20 MHz clock or crystal X1, X2) while a new instruction is being fetched; execution of an instruction may include accessing the on-chip RAM 15 for an operand, or writing a result into data RAM 15, and an arithmetic or logic operation in ALU.

In the example to be described in detail, a 12-bit instruction address applied internally to ROM 14 or externally to the RA bus directly addresses $2^{12}$ or 4K words of program instruction or constants in ROM 14 and memory 11. When reading from memory 11, a DEN_ (data bus enable bar) command is asserted on control bus 13. It is also possible to write into the memory 11, and for this purpose a WE_ (write enable bar) command is asserted by the device 10 on one of the control bus lines 13; the memory 11 may contain read/write memory devices in some or all of the address space, so the WE_ command permits a write function.

The I/O devices 12 are addressed as ports; this interface to external devices 12 is accomplished using the address and data busses RA and D and control bus 13. However, because of the capability of microcomputer 10 to utilize portions of address bus RA for port addressing, the I/O devices 12 do not occupy locations in the logical address space like the memory 11. This is in contrast to conventional memory-mapped I/O. It should be noted, however, that the number of available ports depends upon the number of terminals utilized by microcomputer 10 for I/O port addressing. As a result, similarly as the need to minimize the number of dedicated locations in the logical address space of the memory in conventional memory-mapped I/O systems, a need exists to minimize the number of dedicated locations in the port address space in microcomputer 10 constructed according to the invention.

Data input/output via I/O or peripherals 12 employs a 3-bit field RAp from the bus RA to select one of eight 16-bit ports P0–P7 in peripheral circuitry 12. Each port can be defined as either input or output by DEN_ or WE_, so in effect these are sixteen 16-bit port ports, eight in and out. The selected 16-bit port is addressed by RAp and DEN_ or WE_, then accessed for read or write via the bus D. This operation uses one of the two instructions IN or OUT; on the control bus 13, WE is active for write or OUT, or DEN_ is active for read or IN. A ROM clock RCLK_ is active on control bus 13 on every machine cycle except when either DEN_ or WE_ is active; that is, the memory 11 is activated by RCLK_ for possible instruction word access from off-chip in each machine cycle, but if accessing peripheral 12 using DEN_ or WE_ then the RCLK_ does not occur.

As will be described in further detail below, certain control registers in microcomputer 10 occupy one of the ports addressable by port address field RAp. Serial port 100 occupies another of said ports in port address field RAp. It will be seen, however, that the addition of channels to serial transmit bus DX and serial receive bus DR does not require additional port addresses to be dedicated in a microcomputer constructed according to the invention. Similarly, if logical address space were to be used for I/O, in the conventional memory-mapped I/O manner, utilization of the invention would allow additional serial communications without requiring additional logical addresses to be dedicated for the additional channels.

A reset signal RS_ on the control bus 13 clears the program counter and address bus RA (resets to zero), sets the data bus D in a high impedance state, and the memory controls DEN_, WE_ and RCLK_ in an inactive (high) state. All address and temporary data registers within the microcomputer 10 are cleared by a reset routine in the ROM 14, but the internal RAM is not cleared. In this manner, the peripheral circuitry 12 (such as a main processor) can assert control, or initiate a start-up or power-on sequence.

An interrupt signal INT_ on the control bus 13 will generate a master interrupt signal MIS, which in turn will cause the microcomputer 10 to halt execution (saving the current ROM address) and go to an interrupt vector address, unless interrupts are masked by the program. The receipt and multiplexing of various interrupt signals will be discussed in further detail below.

The ME/SE_ line in the control bus 13 defines the memory expansion mode or systems emulator mode for the microcomputer 10. When this pin is held high (at +Vcc), the microcomputer executes from on-chip ROM and off-chip memory 11, but when low (Vss) the chip is in the systems emulator mode and execution is only from the memory 11 which is a PROM, EPROM or RAM so the program can be easily changed.

The Microcomputer Chip

Figure 2A:
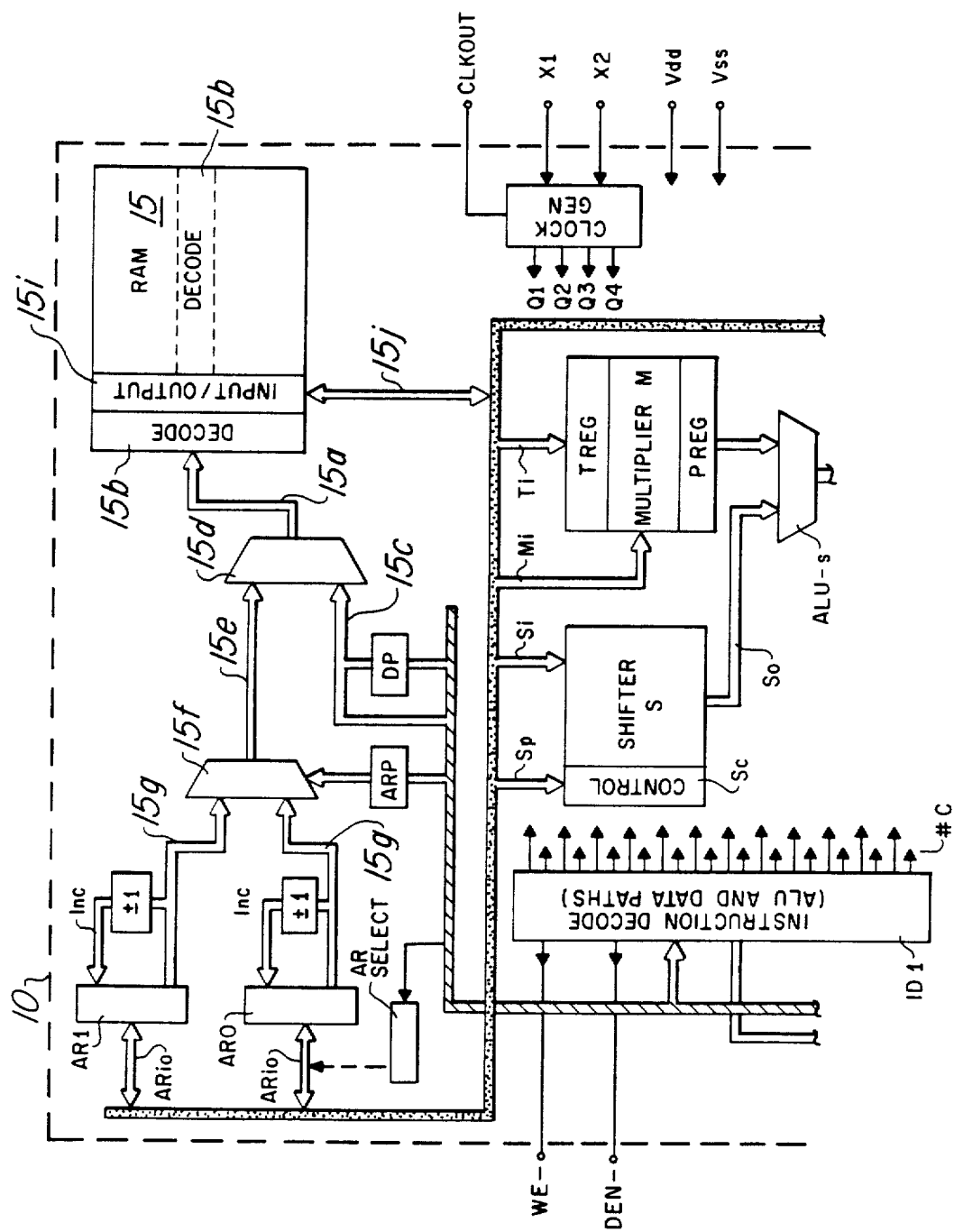
FIGS. 2a through 2c constitute an electrical diagram in block form of an MOS/LSI microcomputer device (including a CPU or central processor unit) employed in the system of FIG. 1 and utilizing features of the invention.
Figure 2B:
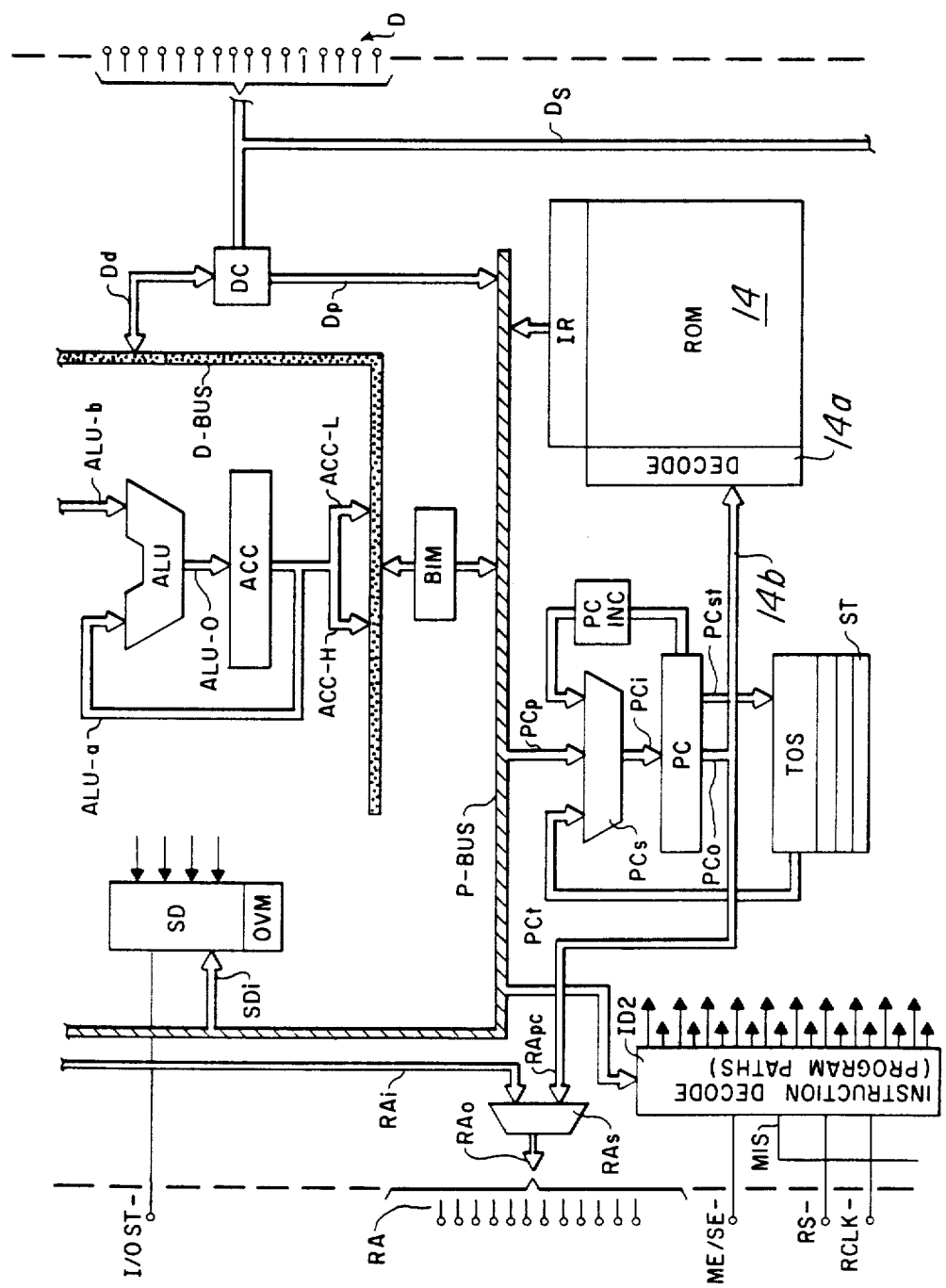

The internal architecture of the microcomputer 10 is shown in a detailed block diagram in FIG. 2. This device is a single-chip semiconductor integrated circuit 10 mounted in a standard 40-pin dual-in-line package or a chip carrier. Sixteen pins or terminals of the package are needed for the 16-bit data bus D, twelve are used for the address bus RA and the remaining terminals are used for the power supply Vdd and Vss, the crystal X1, X2, and the control bus 13.

In addition to the program and data memory 14 and 15, the microcomputer 10 contains a central processing unit or CPU for the system of FIG. 1, and this CPU includes a 32-bit arithmetic/logic unit or ALU, a 32-bit accumulator Acc to hold operands and results, multiplier M separate from the ALU, a shifter S which is one input to the ALU, status or flag decode SD, and an instruction decoder ID1 which receives the current instruction word and generates the control bits for the CPU and data memory portions of the device 10.

The program memory 14 has associated with it a program counter PC to hold the instruction address used to access the ROM 14 or sent out on bus RA to the memory 11, an instruction register IR to receive the instruction word form ROM 14, a stack ST to save program memory addresses, and an instruction decoder ID2 which receives the current instruction word and generates control bits for the program memory portion of the microcomputer. The instruction decoders ID1 and ID2 of course may be combined into one larger control ROM, or indeed split into smaller PLAs or random logic.

Associated with the data memory 15 are two auxiliary address registers AR0 and AR1 for the data memory 15, a page register ARP to select between the registers AR0 and AR1 for use as the data memory address, and a data page buffer DP to hold certain bits of the data memory address.

The CPU is oriented around two internal busses, a 16-bit program bus (P-bus) and a 16-bit data bus (D-Bus). Program access and data access can thus occur simultaneously, and the address spaces are separate. The microcomputer is thus of the Harvard architecture, although a bus interchange module BIM permits loading the program counter PC from Acc, for example, or accessing ROM 14 for constants via P-Bus, BIM and D-Bus.

The two major requirements for a signal processing microcomputer are high speed arithmetic and flexibility. Performance is achieved by using separate, principally on-chip program and data memories 14 and 15, a large single accumulator Acc and a parallel multiplier M. A special purpose operation, data move, is defined within the data memory 15 which further enhances the performance in convolution operations. Flexibility has been achieved by defining an instruction set as will be described with reference to Table A, incorporating memory expansion and a single level if interrupt.

The device can be configured with, for example, less than 2K or $2^{11}$ words of on-chip program memory 14 yet the architecture allows for memory expansion up to 4K or $2^{12}$ words by the addition of external program memory in the memory 11. In addition, a separate mode allows the device 10 to be configured as a system emulation device; in this "system emulator" mode, the entire 4K memory space is external and the ROM 14 is not used.

The CPU

The arithmetic/logic unit or ALU consists of thirty-two parallel stages, each separate stage performing an arithmetic or logic function on its two input bits and producing a one-bit output and carry/borrow. The particular function performed on data passing through the ALU is defined by the current 16-bit instruction word in IR which is applied by the program bus P-BUS to an instruction decoder ID1. The ALU has two 32-bit data inputs ALU-a and ALU-b, and a 21-bit data output ALU-o to accumulator Acc. The ALU-a input is always from the accumulator Acc and the ALU-b input is always either from the shifter S or from a 32-bit product register P in the multiplier M. The source of the ALU-b input is defined by an input select circuit ALU-s which selects from these two alternatives, based upon the contents of the current instruction word, i.e., the outputs #C of the decoder ID1. The shifter S receives a 16-bit input Si from D-Bus and produces a 32-bit output So which is the input Si shifted from zero to fifteen places to the left. Left-shifted data is zero-filled, i.e., all right-hand bit positions are filled with zeros when data is shifted out to the left. A unique feature is that the high-order bit is sign extended during shift operations. The ALU operates in twos-complement. The shifter S includes a shift control Sc loaded with a four-bit value from P-Bus via lines Sp so an arithmetic instruction can directly define the number of bits shifted in the path from D-Bus to the ALU-b input.

In this description, the LSB is considered to be on the right and the MSB on the left, so left-shift is toward more significant bits. Bit-0 is the MSB and bit-15 is the LSB. Data is usually handled in signed 2's complement in this architecture.

The multiplier M is a 16×16 multiplier using carry feed-forward, constructed in dynamic/static logic, to implement Booth's algorithm. One input to the multiplier M is the T register which is a 16-bit register for temporary storage of the multiplicand received from D-Bus via lines Ti. The other 16-bit input is via lines Mi from the D-Bus; this multiplier input may be from the data memory 15 or may be a 13-bit multiply-immediate value derived directly from the instruction word (loaded right-justified and sign-extended).

The ALU always receives the contents of the accumulator Acc as its ALU-a input, and always stores its output in Acc, i.e., Acc is always the destination and the primary operand. The unit will add, subtract and perform the logic operations of And, Or and Exclusive Or. The logic operation results are between the lower half of Acc (bits 16–31) and a 16-bit value from the data memory 15. Due to passing the data memory value through the shifter S (with zero shift), the operand for the logical operation result of the MSBs (bits 0–15) is zero. The final 32-bit result reaching the accumulator is thus in two parts: Bits 0–15 will be Acc bits 0–15 AND-ed (or OR-ed, etc.) with zero; bits 16–31 of the result will be Acc bits 16–31 AND-ed (etc.) with the data memory value. The accumulator Acc output, in addition to the 32-bit ALU-a input, includes high and low 16-bit outputs Acc-H (bits 0–15) and Acc-L (bits 16–31); separate instructions SACH "store accumulator high"

and SACL "store accumulator low" are provided for storing high and low-order ACC 16-bit words in the data memory 15.

The status decoder SD monitors the Acc whenever an instruction which updates Acc is executed. Four bits of SD are OV, L, G and Z. Accumulator overflow (or underflow) is indicated by the L bit, Acc greater than zero indicated by the G bit, and Acc equal zero indicated by the Z bit. Upon interrupt the OV bit is saved in an overflow flag register, but the other bits are available only up to the time the next accumulator instruction is executed.

The accumulator overflow mode is a single-bit mode register OVM (included in SD), directly under program control, to allow for saturated results in signal processing computations. When the overflow mode OVM is reset, overflow results are loaded via ALU-o into the accumulator Acc from the ALU without modification. When the overflow mode is set, overflow results are set to the largest, or smallest, representable value of the ALU and loaded into the accumulartor Acc. The largest or smallest value is determined by the sign of the overflow bit. This allows a saturated Acc result in signal processing applications, modeling the saturation process of analog signals.

A separate status bit in SD monitors the condition of the currently used auxiliary register AR0 or AR1 and detects all all-zero condition of the least significant nine bit of the current auxiliary register (i.e. loop counter portion). This bit is used for a branch instruction conditioned on non-zero for the auxiliary register, BARNZ or "branch on auxiliary register non-zero."

The input/output status bit I/O ST_ is an external pin which is part of the control bus 13 and provides "branch on I/O zero" instruction BIOZ to interrogate the condition of peripheral circuits 12. A zero level on the I/O ST_ pin will cause a branch when sampled by the BIOZ instruction.

The bus interchange module BIM exchanges the low-order twelve bits of the 16-bit value on the D-Bus with the low-order twelve bits on the P-Bus. This operation is not available to the programmer as an instruction, but instead is needed as an inherent operation in instructions such as table look up TBLR A or table write TBLW, or in a call-accumulator instruction CALLA where a computed address in Acc may be used to reach a subroutine. A 16-bit value from IR on the P-Bus may be loaded via BIM to D-Bus for storing in RAM 15, for example, in table-read.

Program Memory Addressing

The program memory 14 is a ROM which is partitioned X16 to produce a 16-bit output to instruction register IR, and this ROM employs a decoder 14a which selects one 16-bit instruction word based on an 11-bit or 12-bit address on input lines 14b. In the example embodiment, the ROM 14 contains less than 2K words, so an 11-bit address can be used, but the on-chip program memory could be expanded to 4K with a 12-bit address. The circuit of the ROM 14 is especially adapted for fast access as will be explained. The address input 14b is received from the program counter PC which is a 12-bit register containing the address of the instruction following the one being executed. That is, at the time when the control bits #C are valid at the outputs of the instruction decoders ID1 and ID2 for one instruction; PC contains the address of the next instruction. After an address in PC goes into decoder 14a to read the next instruction from ROM 14 into IR, the program counter PC is incremented via PCinc in preparation for another instruction fetch; i.e. PC is self incrementing under control of a #C control bit from ID 2. The output PCo from the program counter PC is also applied via lines RApe and selector RAs (and output buffers not shown) to the external RA bus via output lines RAo and twelve output pins of the microcomputer device. The RA bus (RA0 through RA11) contains the PC output via RApe when the selector RAs is in one mode, or contains the 3-bit port address input RAi when executing I/O instructions IN and OUT. Whenever the address in PC is above the highest address in ROM 14, off-chip program addressing to memory 11 is assumed; however, the device is designed to operate principally with the on-chip ROM 14, so for many uses of the device off-chip fetches from program instructions would never be needed. The program counter PC may be loaded via input PCi and selector PCs from the P-Bus for branch or call instructions, or loaded from the accumulator Acc via Acc-L, D-Bus, BIM, P-Bus, PCp and PCi in a "call accumulator" CALLA instruction or table-read and table-write.

The register stack ST is used for saving the contents of PC during subroutine and interrupt calls. In the illustrated embodiment, the stack ST contains four 12-bit registers constructed as first-in, last-out push-down stack, although a larger or smaller number of registers could be used. The current contents of PC are saved by "pushing" onto the top-of-stack register TOS via lines Pct. CALL instructions will keep pushing the current contents of PC onto TOS as the prior contents are shifted down, so up to four nested subroutines can be accommodated A subroutine is terminated by execution of a return instruction RET which "pops" the stack, returning the contents of TOS to PC via lines PCt, selector PCs and input PCi, allowing the program to continue from the point it has reached prior to the last call or interrupt. When TOS is popped, the addresses in lower registers of ST move up one position. Each subroutine, initiated by a call instruction or an interrupt, must be terminated by a RET instruction.

In an example embodiment, the ROM 14 contains 1536 words, so the remainder of the 4K program address space, 2560 words, is off-chip in the memory 11. When the memory expansion control pin ME/SE_ is high,, at logic 1, the device interprets any program address pin PC in the 0 to 1535 range as being an on-chip address for the ROM 14, and any address in the 1536-4095 range as being an off-chip address so that the PC constants are sent out via RApc and RAo to the RA bus. An output strobe RCLK_ generated by the decoder ID2 for every machine state enables the external memory 11 (except when IN or OUT instructions are being executed). When off-chip program memory 11 is accessed, the instruction word read from memory 11 is applied to the external bus D and thus to the internal P-Bus via input/output control DC and lines Dp; this is a 16-bit instruction and, like the output of ROM 14 via IR, it is loaded into decoders ID1 and ID2 for execution, or 12-bits are loaded into PC via PCp, or otherwise used just as on on-chip instruction fetch.

When the ME/SE_ pin is at zero the device enters the system emulator mode wherein the entire 4K program address space if off-chip, so all PC addresses are applied to the RA bus via RApc and RAo. This mode is necessary when a user is developing systems or programs, prior to arriving at a final version of code for the ROM 14. That is, the microcomputer 10 can operate with no code permanently programmed into the ROM so that new programs (stored in RAM or EPROM in the memory 11) can be tested and debugged, then when the final code is established the chips 10 are produced in large volume with this code mask-programmed into the ROM 14.

The first two program addresses 0000 and 0001 are used for the reset function. When the reset pin RS_ is brought low, an address of all zeros is forces into the program counter PC, as will be explained. Also, when an unmasked interrupt is received, causing master interrupt signal MIS to be generated, an address of 0002 is forced into PC to begin an interrupt routine.

Data Memory Addressing

The data memory 15 in the example embodiment contains 144 16-bit words, and so an 8-bit address is needed on address input 15a to the RAM address decoder 15b. However, the RAM 15 may be constructed with up to 512 words, requiring a 9-bit address, so the addressing arrangement will be described in terms of address bits which are unused in some embodiments. Each 128 word block of the RAM 15 is considered to be a page, so a 7-bit address field in an instruction word from program memory 14 on P-Bus via input 15c is used to directly address up to 128 words of data memory 15, within a page, and the page is selected by a data page buffer DP. Alternatively, for indirect addressing, two auxiliary registers AR0 and AR1 are employed in the example embodiment; however, up to eight of these 16-bit auxiliary registers may be used, with the particular one currently being used as the source of the indirect address for the RAM 15 being defined by the auxiliary register pointer ARP. With two registers AR0 and AR1, the pointer ARP is only one bit, but for an embodiment with eight auxiliary registers the pointer ARP is a 3-bit register. The 16-bit auxiliary registers AR0 and AR1 are under control of indirect-address instructions, or store, load or modify auxiliary register instructions SAR, LAR, and MAR, as will be described. Nine-bit addresses from the low-order parts of the auxiliary registers may be applied to the address input 15a via selector 15d, lines 15e, selector 15f, and lines 15g, the paths being defined by control bits #C from ID1. When one of the auxiliary registers is to be the source of the RAM address, the selector 15d uses the value on lines 15e as the address input 15a, whereas if the P-Bus is to be the source of the RAM address the selector 15d uses a 7-bit address from input 15c and a 1-bit (expandable to 3-bit or 4-bit) page address from the data page register DP. The selector 15f is controlled by the pointer ARP which is loaded from P-Bus as defined by an instruction. The auxiliary registers are used for indirect addressing wherein an instruction word need not contain a complete address for RAM 15 bus instead merely specifies that an auxiliary register is to be used for this address; such instructions can also specify increment or decrement for the auxiliary register selected, in which case the nine LSBs of AR0 or AR1 are changed by +1 or -1 via paths INC. The auxiliary registers may be thus used as loop counters. The auxiliary registers are accessed by the D-Bus via lines ARio so these registers may be used as miscellaneous working registers, or may be initially loaded to begin a loop count.

The data memory 15 is accessed using the D-bus and an input/output circuit 15i, via lines 15j. Construction of the data memory is such that a data move wholly within the RAM 15 is permitted, according to an important feature of the microcomputer 10. Under instruction control, the data at one address can be moved to the next higher location within one machine cycle without using the ALU or D-Bus. Thus during an add, for example, the accessed data can be also moved to the next higher address.

Input/Output Functions

Input and output of data from the microcomputer chip 10 uses the data bus D and two of the lines of the control bus 13, these being data enable bar DEN_ and write enable bar WE_. Two instructions, IN and OUT, are employed for the data input and output functions. The external data bus D is coupled to the internal data bus D-Bus by the input/output control and data buffers DC and lines D1. The output buffers in DC are tri-state, so the output to data bus D from DC is always placed in a high impedance state except when OUT is being executed; to this end, one of the controls #C from the instruction decode ID1 sets the output buffers in high impedance state whenever OUT is not decoded. When the instruction IN is present, the control DC activates sixteen input buffers, so the external data bus D is coupled to the internal D-Bus via DC and lines Dd for data input. When the OUT instruction is decoded, a control #C from ID1 activates output buffers in DC so the internal D-Bus is coupled via Dd and DC to the external bus D.

As will be explained in greater detail with respect to FIG. 2c, lines $D_s$ are also connected to external data bus D. Lines $D_s$ allow communication of data between serial port 100 and the remainder of microcomputer 10, as well as between serial port 100 (and control registers contained therein) and I/O devices 12.

Execution of an IN instruction will also generate a data enable DEN_ strobe on line 13a from ID1, and will couple the D-Bus to the RAM 15 via 15i and 15j, so the data from external will be entered into on-chip data memory. The intended uses of the microcomputer as a signal processor require hundreds or thousands of accesses to RAM 15 for every off-chip reference. That is, a value will be fetched from off-chip then convolution or like operations performed using this new value and other data in the RAM 15, so thousands of instruction executions will transpire before another off-chip reference is needed. For this reason, the architecture favors internal data manipulation over off-chip data access.

Execution of an OUT instruction causes generation of an off-chip write enable WE_ strobe on line 13b from ID1 and outputs data from RAM 15 via 15i and 15j, D-Bus, lines Dd and buffer DC to the external bus D. Referring to FIG. 1, this data may be written into one of the ports P0–P7 (selected by the 3-bit RAi value_ in the peripherals 12.

Implicit in both the IN and OUT instructions is a 3-bit port address on lines RAi and ID1. This address is multiplexed onto the three LSBs (RA9–RA11) of the external address bus RA via selector RAs. Up to eight peripherals may thus be addressed. The remaining high order bits of the RA bus outputs are held at logic zero during these instructions.

Serial Port And Companding Hardware

Figure 2C:
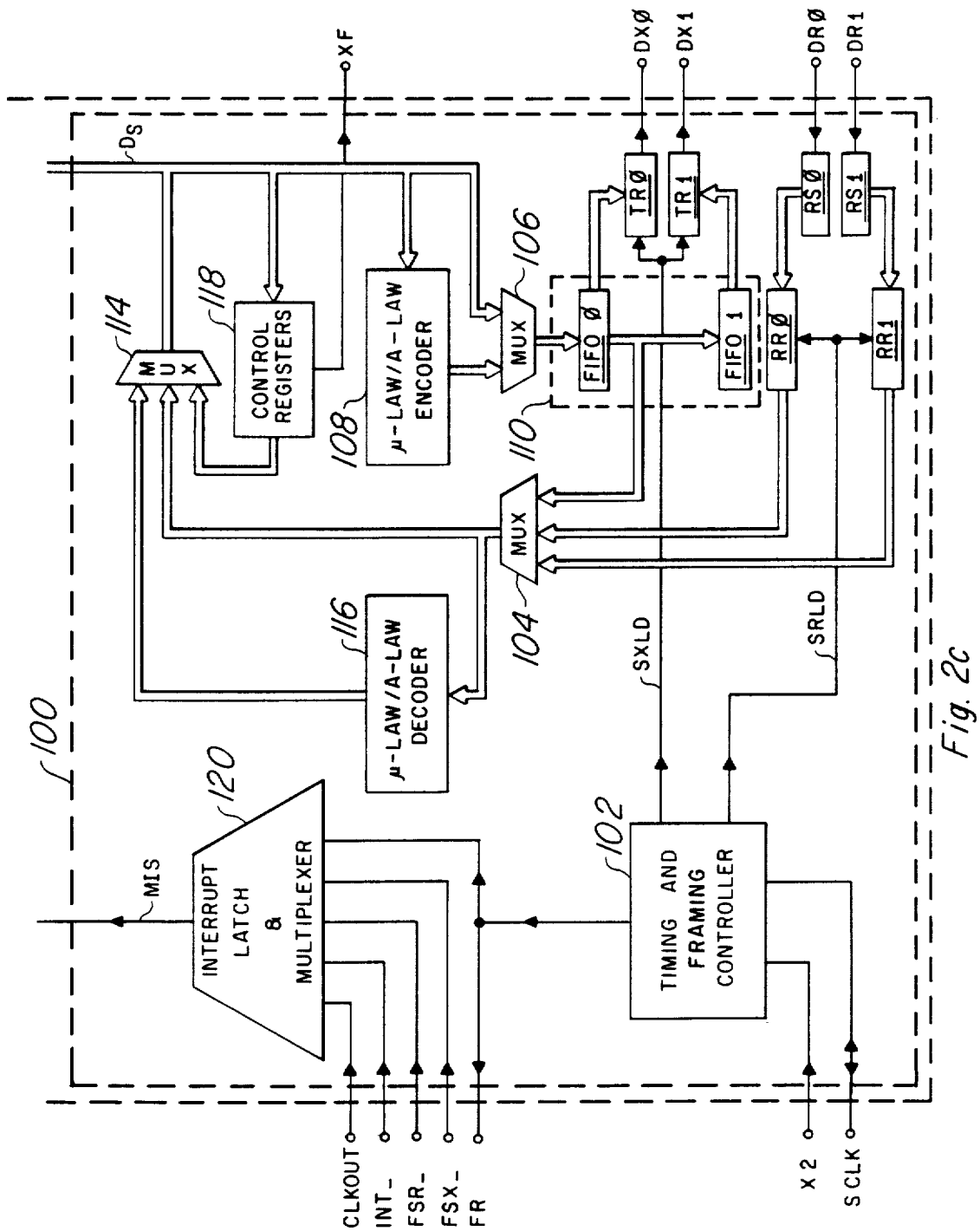

Referring now to FIG. 2c, the construction and operation of serial port 100, as incorporated into microcomputer 10, will be discussed in detail. Serial port 100 has serial output terminals DX0 and DX1, and has serial input terminals DR0 and DR1, said terminals to be connected to serial transmit bus DX and serial receive bus DR, respectively, of FIG. 1. As discussed above, serial transmit bus DX and serial receive bus DR can consist of more than two parallel conductors, in turn requiring more than two serial input and serial output terminals of serial port 100. While the preferred embodiment of the invention incorporates two serial channels, it is of course understood that additional serial input and serial output terminals may be incorporated within the spirit and scope of the invention.

Serial input terminals DR0 and DR1 are connected to receive shift registers RS0 and RS1, respectively. Receive shift registers RS0 and RS1 are each eight-bit serial-in parallel-out shift registers, as are well known in the art. The parallel outputs of receive shift registers RS0 and RS1 are connected to receive registers RR0 and RR1, respectively. Receive registers RR0 and RR1 are each eight-bit registers with gated inputs, as are well known in the art, with the inputs of both registers gated by load signal SRLD. Load signal SRLD is generated by timing and framing controller 102 at the time at which the contents of receive shift registers RS0 and RS1 are to be loaded into receive registers RR0 and RR1, respectively. The outputs of receive registers RR0 and RR1 are connected to separate inputs of multiplexer 104.

On the transmit side, external data bus D, via lines $D_s$, is connected to an input of multiplexer 106, and is connected to encoder 108. Encoder 108, as will be explained in greater detail below, is a digital encoder used in performing the companding function used in certain communications applications. The output of encoder 108 is connected to the other input of multiplexer 106. As is evident from FIG. 2c, multiplexer 106 the data to be serially transmitted by serial port 100 to be either encoded or not encoded. The output of multiplexer 106, carrying parallel data for output from serial output terminals DX0 and DX1, is connected to stage FIFO0, the first stage of first-in first-out memory 110. Stage FIFO0, an eight-bit register, has its output connected to the parallel input of transmit register TR0, to stage FIFO1 of first-in first-out memory 110, and to an input of multiplexer 104. Stage FIFO1 has its output connected to the parallel input of transmit register TR1. Transmit registers TR0 and TR1 are each eight-bit parallel-in serial-out registers, with the input gated by load signal SXLD. Load signal SXLD is generated by timing and framing controller 102 to cause the contents of stages FIFO0 and FIFO1 to be loaded into transmit registers TR0 and TR1, respectively, for serial output onto serial output terminals DX0 and DX1, respectively.

The output of multiplexer 104 is connected to an input of multiplexer 114, and to the input of decoder 116. Decoder 116, as will be discussed in greater detail below, is a digital decoder used in decoding data which has been encoded by the companding function used in certain communications applications, into a form useful by the remainder of microcomputer 10. Multiplexer 104 allows data from either of the receive registers RR0 or RR1, or data from stage FIFO0, to be communicated to external data bus D, with such data to be either decoded or not decoded.

Control register 118 is also connected to external data bus D via lines $D_s$, and are connected to an input of multiplexer 114 for communication of its contents to microcomputer 10. As such, control register 118 may be loaded and read via external data bus D, using the IN and OUT instructions described above, as if control register 118 were an I/O device 12. Accordingly, control register 118 is associated with a value of field RAp from bus RA; in the embodiment described herein said value is 0, but of course the value associated with control register 118 is arbitrary. One bit of control register 118 is connected to the conductor of serial control bus 99 for generating external flag bit XF. No port addressing is required for the output of external flag bit XF, as no conductors in external data bus D are utilized. Table 1 contains an example of the specification of the contents of control register 118, portions of which will be discussed in connection with the operation of the remainder of serial port 100.

Interrupt latch and multiplexer 120 is connected to serial control bus 99, for receiving external framing receive signal FSR__, external framing transmit signal FSX__ and framing signal FR from serial I/O peripheral 112, if serial I/O peripheral 112 generates said signals. Interrupt latch and multiplexer 120 is further connected to control bus 13 for receiving interrupt signal INT__. The output of interrupt latch and multiplexer 120 is master interrupt signal MIS, utilized by instruction decoder ID2 to halt execution of microcomputer 10 and to transfer execution to an interrupt vector address.

Figure 3:
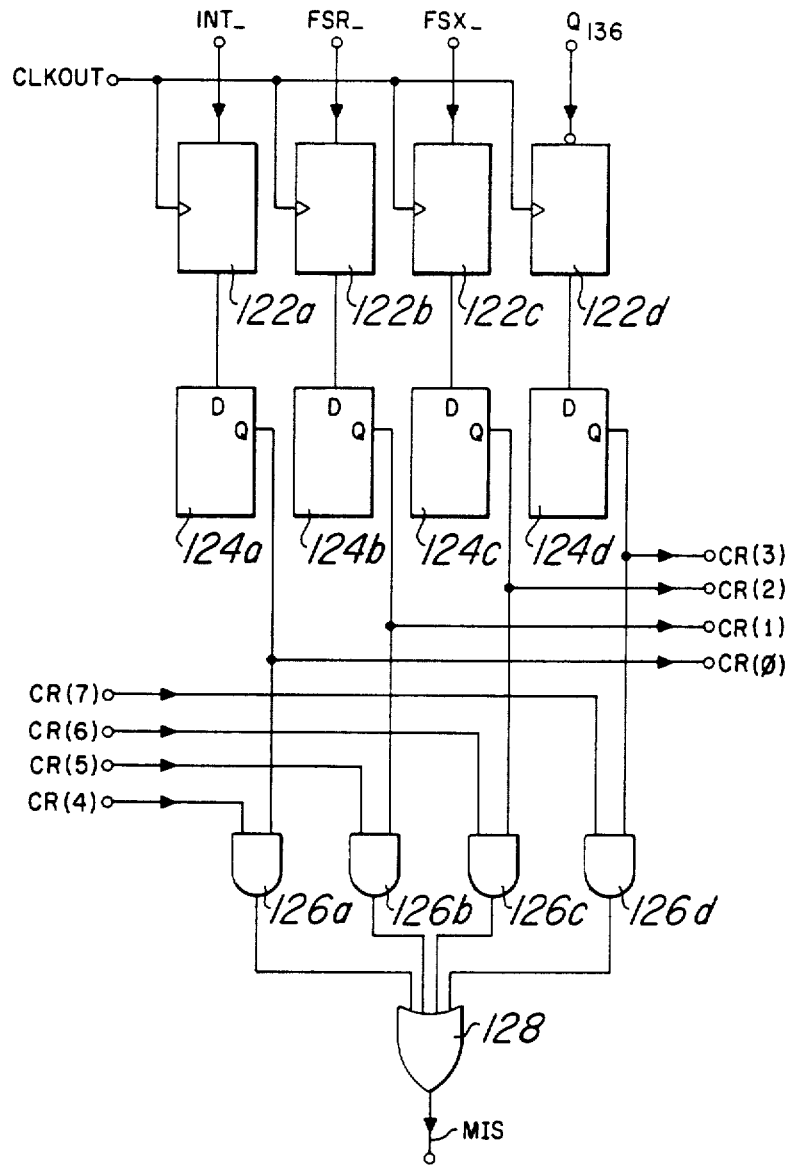
FIG. 3 is an electrical diagram in block form of the interrupt latch and multiplexer circuitry of the microcomputer of FIGS. 2a through 2c.

Referring now to FIG. 3, the construction of interrupt latch and multiplexer 120 will be discussed in further detail. Interrupt signal INT__, external framing receive signal FSR__, external framing transmit signal FSX__, and internal framing signal $Q_{136}$ (the output of latch 136 of FIG. 4) are each received at the logic input of a synchronizer 122; clock signal CLKOUT is received by the clock input of synchronizer 122. It should be noted that internal framing signal $Q_{136}$ is equivalent to one form of internal framing signal FR, as will be further described below. Internal framing signal $Q_{136}$ is inverted at the input of synchronizer 122d, in order to make it consistent with the active-low form of interrupt signal INT__, external receive framing signal FSR__, and external transmit framing signal FSX__. Synchronizers 122a through 122d consist of such combinational logic to perform the function of providing an output which follows the logic input at such time as a transition is received by the clock input. Since interrupt signal INT__, external framing receive signal FSR__, external framing transmit signal FSX__, and internal framing signal $Q_{136}$ are asynchronous relative to clock signal CLKOUT, synchronizers 122a through 122d serve to synchronize the response of microcomputer 10 to said signals, by gating said signals with an edge of clock signal CLKOUT. The outputs of synchronizers 122a through 122d are each connected to the D input of latches 124a through 124d, respectively. The Q outputs of latches 124a through 124d serve as bits CR(0) through CR(3) in control register 118. Referring to Table 1, it should be noted that bits CR(0) through CR(3) are the interrupt flags of microcomputer 10. These interrupt flags indicate, when in their logic "1" state, that the associated interrupt has been received in the last cycle of clock signal CLKOUT. The interrupt flags, i.e., bits CR(0) through CR(3) of control register 118, are therefore set regardless of the interrupt mask-/enable state explained below. It should be noted that latches 124a through 124d may indeed be the latch bits of control register 118; if so, connection to the D input of latches 124a through 124d will be made to external data bus D. If latches 124a through 124d are not themselves the bits CR(0) through CR(3) of control register 118, means for resetting latches 124a through 124d from external data bus D will be provided. After the interrupt has been serviced by microcomputer 10, the corresponding one of bits CR(0) through CR(3) may be rexet to the "0" logic state, awaiting the next interrupt.

Figure 4:
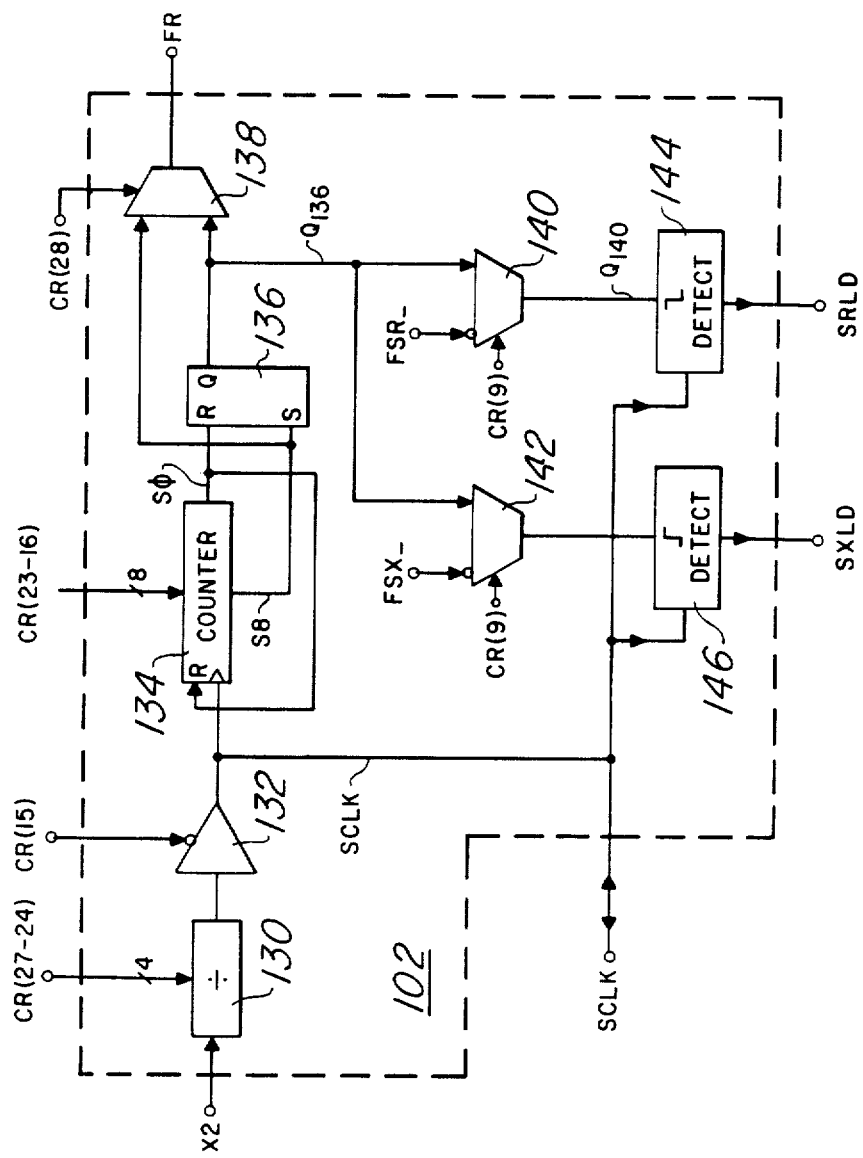
FIG. 4 is an electrical diagram in block form of the timing and framing control circuitry of the serial port as incorporated into the microcomputer as shown in FIGS. 2a through 2c.

The outputs of latches 124a through 124d are further connected to one input of AND gates 126a through 126d. The other inputs of AND gates 126a through 126d are the contents of bits CR(4) through CR(7) of control register 118, respectively. Referring to Table 1, bits CR(4) through CR(7) of control register 118 are the interrupt enable bits which, in their "1" logic state, enable interrupts from interrupt signal INT—, external framing receive signal FSR—, external framing transmit signal FSX—, and internal framing signal $Q_{136}$, respectively. The outputs of AND gates 126a through 126d are each connected to an input of OR gate 128 which generates master interrupt signal MIS in the event that any of the interrupts from interrupt signal INT—, external framing receive signal FSR—, external framing transmit signal FSX—, and internal framing signal $Q_{136}$ are received, and enabled by bits CR(4) through CR(7) of control register 118. Master interrupt signal MIS indicates to instruction decoder ID2 that an unmasked interrupt signal has been received and, as described above, Referring now to FIG. 4, the construction of timing and framing controller 102 will be described in detail. As discussed above, timing and framing controller 102 controls the transmission and receipt of data by serial port 100, through serial output terminals DX0/DX1 and serial input terminals DR0/1. The system clock at terminal X2 is connected to the input of frequency divider 130. It should be noted that terminal X2 of FIG. 4 is of course not a separate physical terminal from terminal X2 of FIGS. 1 and 2a. The contents of bits CR(27) through CR(24) are provided to frequency divider 130, and determines the frequency ratio, relative to the system clock at terminal X2, at which the output of frequency divider 130, and thereby serial clock signal SCLK, will operate. For this embodiment, the applicable divide ratios range from ten to thirty-two. The use of control register 118 to provide the divide ratio of frequency divider 130 allows the user of microcomputer 10 to select different frequencies of serial clock signal SCLK, compatible with different serial I/O peripherals 112. Buffer 132 receives the output of frequency divider 130 and, if enabled by bit CR(15) of control register 118, generates serial clock signal SCLK. If bit CR(15) of control register 118 is set to its "0" state, the output of frequency divider 130 will serve as serial clock signal SCLK, and serial clock signal SCLK will be provided, via serial control bus 99, to serial I/O peripherals 112. The user can set bit CR(15) of control register 118 to a "1" logic state, which will disable buffer 132, in the event that an external device generates serial clock signal SCLK.

Serial clock signal SCLK, whether generated internally by frequency divider 130, or applied externally via serial control bus 99, is connected to the clock input of counter 134. Counter 134 is intended to further perform a frequency division of serial clock signal SCLK, for generation of the desired control pulses for the transmission and receipt of data, synchronous with framing pulses generated externally or internally. Bits CR(23) through CR(16) are loaded into counter 134, and with each pulse of clock signal SCLK, counter 134 decrements its contents. The outputs of counter 134, as will be explained below, provide the signals used as internal framing signals $Q_{136}$ and FR. The frequency of said framing signals, i.e., the number of pulses of serial clock SCLK between each frame of serial data, is determined by the binary number represented by bits CR(23) through CR(16) of control register 118 minus two; upon reaching the count determined by this number, counter 134 is reset to zero. Since the data word length is eight bits for serial port 100, this number must be eight or greater to provide sufficient pulses of serial clock SCLK within each frame to transmit or receive all eight bits of the data bytes.

Counter 134 has outputs S0 and S8. Output S0 is at a "1" logic state when the contents of counter 134 equal zero, and is fed back to the reset input of counter 134. This causes the contents of bits CR(23) through CR(16) of control register 118 to be reloaded into counter 134 each time counter 134 decrements its contents to zero; this occurs periodically with the number of cycles of serial clock signal SCLK set by the contents of bits CR(23) through CR(16) of control register 118. Output S8 is at a "1" logic state when the contents of counter 134 equal eight. Since counter 134 is a decrementing counter, output S8 is at a "1" logic level eight cycles of serial clock signal SCLK prior to the reset of counter 134 by output S0. Outputs S0 and S8 of counter 134 are connected to the R and S inputs, respectively, of R-S latch 136. Output S8 of counter 134 is also connected to a first input of multiplexer 138, while the Q output of R-S latch 136 ($Q_{136}$) is connected to the other input of multiplexer 138. The Q output of R-S latch 136 is at its "1" logic level beginning with output S8 of counter 134 going high (eight pulses of serial clock SCLK prior to reset of counter 134), and ending with output S0 of counter 134 going high upon the contents of counter 134 reaching zero (at reset of counter 134). Therefore, the two inputs of multiplexer 138 consist of two pulses, each beginning eight cycles of serial clock SCLK prior to reset of counter 134, one of these two pulses (output S8) having a duration of a single serial clock SCLK pulse, and the other of the two pulses ($Q_{136}$) having a duration of eight serial clock SCLK pulses. Multiplexer 138 is responsive to bit CR(28) of control register 118 to select either the short or long pulses to serve as internal framing pulse FR. If the contents of bits CR(23) through CR(16) of control register 118 specify more than eight pulses of serial clock signal SCLK for each frame, the additional pulses of serial clock SCLK outside of the frame will be of no effect relative to serial data transmission and receipt, and will merely be a delay until the next frame occurs.

The Q output of R-S latch 136 (i.e., the long framing signal $Q_{136}$) is further connected to an input of each of multiplexers 140 and 142. The other input to multiplexer 140 is external receive framing pulse FSR— (inverted), while the other input to multiplexer 142 is external transmit framing pulse FSX— (inverted). Bit CR(9) of control register 118, in its "0" logic state, causes multiplexers 140 and 142 to select the Q output of R-S latch 136, and in its "1" logic state causes multiplexers 140 and 142 to select the inverted external framing signals.

The output of multiplexer 140 is connected to the detect input of edge detector 144, and also has serial clock signal SCLK connected to a logic input. Edge detector 144 is responsive to the falling edge of the output of multiplexer 140 during such time as serial clock signal SCLK is at a high logic level, so that its output goes to a logic "1" state at the end of a framing pulse. In the event serial clock signal SCLK is at a low logic level at such time as the falling edge of the output of multiplexer 140 (signal $Q_{140}$), the output of edge detector 144 will go to a logic "1" upon serial clock signal SCLK next going to a high logic level after the falling edge of the output of multiplexer 140. Edge detector 144 (and edge detector 146 discussed below) may be constructed using any of a number of well known combinational logic realizations to perform the described function. The output of edge detect 144 is receive register load signal SRLD which, as discussed above, causes receive registers RR0 and RR1 to be loaded with the contents of receive shift registers RS0 and RS1, respectively. As discussed above, external framing signal FSR__ is a negative logic signal which extends in its low logic state for eight cycles of serial clock signal SCLK, going to a high logic state at the end of the eight-bit frame, at which time the contents of receive shift registers RS0 and RS1 are to be loaded into receive registers RR0 and RR1. Similarly, when internal framing control is desired, the long framing pulse at the Q output of R-S latch 136 will be in a high logic state during the eight bit frame, returning to a low logic state at the end of the frame, when the serial input data is to be loaded into receive registers RR0 and RR1. Accordingly, receive register load signal SRLD is to be triggered at the end of the frame, i.e., at the falling edge of the long framing pulse, or of inverted external receive framing signal FSR__. The use of serial clock signal SCLK in its high logic state to gate the edge detection is to ensure that the receive register load takes place at such a time that the receive shift registers are not shifting data, since a load during shift would result in indeterminate data being stored by receive registers RR0 and RR1.

Similarly, the output of multiplexer 142 is connected to the input of edge detect 146, edge detect 146 being responsive to the rising edge of the output of multiplexer 142 during such time as serial clock signal SCLK is in a high logic state. The output of edge detect 146 is transmit register load signal SXLD, which causes the contents of stages FIFO0 and FIFO1 to be loaded into transmit registers TR0 and TR1, respectively. As opposed to the receive register load signal SRLD, transmit register load signal SXLD must occur at the beginning of the frame; edge detect 146 is accordingly made responsive to the rising edge of the long framing signal from the Q output of R-S latch 136, and of the (inverted) external transmit framing signal FSX__. Similarly as above relative to the receive register load, the transmit register load is timed by serial clock signal SCLK so that a register load is not done during a data shift in transmit registers TR0 and TR1, which would cause the loaded data to be in indeterminate data positions within transmit registers TR0 and TR1.

Figure 5:
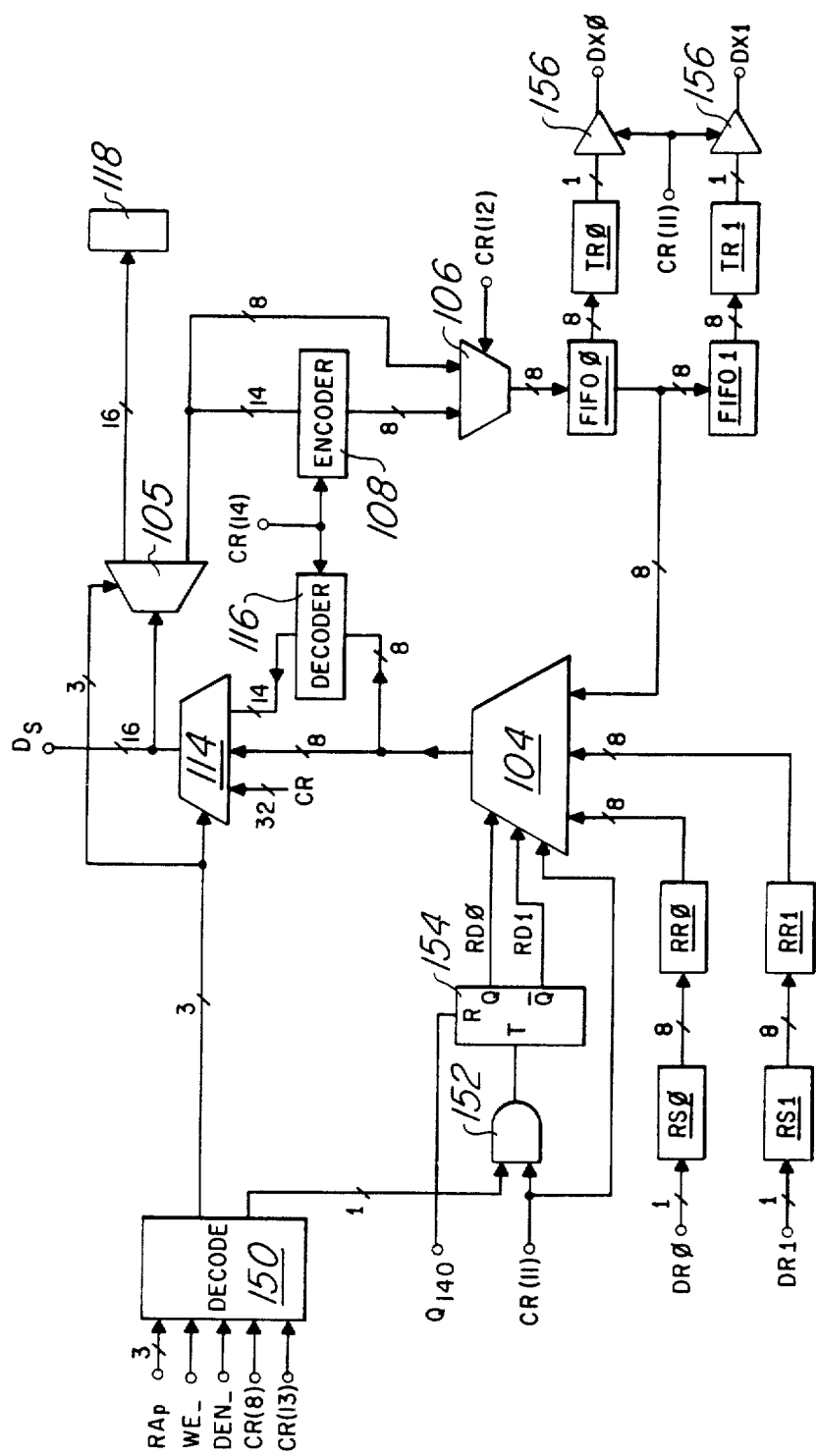
FIG. 5 is an electrical diagram in block form of the serial port of the microcomputer of FIGS. 2a through 2c, illustrating in greater detail the control of the elements therein.

Referring now to FIG. 5, control of serial port 100 will be described with reference to additional control logic not shown in FIG. 2c, and with reference to the contents of control register 118 as defined in Table 1. Decode 150 is a block of combinational logic which receives as inputs the three-bit port address RAp, signals WE__ and DEN__ from control bus 13, and the contents of bits CR(8) and CR(13) of control register 118. Referring to Table 1, the state of bit CR(8) controls access by lines $D_s$ of external data bus D to either serial port 100 or to the upper word of control register 118. Referring to Table 1, it is apparent that control register 118 contains more than sixteen bits. Since external data bus D is only a sixteen-bit bus, control register 118 is accessible only sixteen words at a time. Bit CR(8) can be set by accessing port address 0, via port address bits RAp; once set, port address 1 will refer to the upper word of control register 118 (i.e., bits CR(28) through CR(16)) rather than to serial port 100. Decode 150 accomplishes this via control of multiplexer 114; the three-bit output of decode 150 will cause multiplexer 114 to choose for its output the upper word of control register 118 responsive to bit CR(8) being in its "1" position in combination with port address RAp having a value of "1", and in combination with signal DEN__ from control bus 13 being active. Note that the three-bit output of decode 150 also controls demultiplexer 105 to connect lines $D_s$ of external data bus D to control register 118, which occurs responsive to bit CR(8) being in its "1" position in combination with port address RAp having a value of "1", and in combination with signal WE__ from control bus 13 being active (as during an OUT instruction). Similarly, decode 150, via multiplexer 114 or demultiplexer 105, will read from, or load to, the lower word of control register 118 (i.e., bits CR(15) through CR(0)), responsive to port address RAp having a value of "0", in combination with signals DEN__ or WE__ from control bus 13 being active, as the case may be. As discussed above, the execution of an IN instruction will cause an active pulse of signal DEN__ in control bus 13, and the execution of an OUT instruction will cause an active pulse of signal WE__.

With bit CR(8) of control register 118 in its "0" logic state, however, a value of "1" at port address RAp in conjunction with an active DEN__ signal from control bus 13 will allow communication between serial port 100 and lines $D_s$ of external data bus D. This communication can take place either in the form of a standard eight-bit byte, or in the form of a fourteen-bit decoded word, depending upon the state of bit CR(13) of control register 118. The decoding is performed by decoder 116, which receives an eight-bit input from the output of multiplexer 104 and provides a fourteen-bit output to an input of multiplexer 114. The decoding is done according to one of two well-known techniques for the compressing and expanding (commonly called "companding") of data, such companding often done in data communications in order to improve the signal-to-noise ratio. As is well known in the communications art, such companding is often done according to the "u-255" law, or alternatively in the "A" law. These two laws reflect two well-known methods for companding data, and are utilized by different combo-codec hardware serving as serial I/O peripherals 112 (of FIG. 1). Bit CR(14) of control register 118 is provided as an input to decoder 116 to select between the u-law (bit CR(14) being a "0") and A-law (bit CR(14) being a "1") formats. Regardless of the law used by decoder 116, multiplexer 114 selects between the eight-bit output of multiplexer 104 (i.e., the un-decoded eight-bit byte) and the output of decoder 116 based upon the value of bit CR(13) of control register 118. If bit CR(13) of control register 118 is in its "0" state, multiplexer 114 will place the output of multiplexer 104 onto lines $D_s$ of external data bus D; if bit CR(13) of control register 118 is in its "1" logic state, multiplexer 114 will place the output of decoder 116 onto external data bus D.

Decode 150 further serves to control multiplexer 104, which controls the communication of serial data from serial input terminals DR0 and DR1 in such a manner that only the single port address is necessary for communication with said terminals. Responsive to port address RAp having a value of "1" in combination with bit CR(8) of control register 118 being in its "0" logic state, decode 150 will provide a high logic level upon an active DEN_ signal on control bus 13, i.e., upon execution of an IN instruction. The single-bit output of decode 150 is connected to an input of AND gate 152; connected to the other input of AND gate 152 is bit CR(11) of control register 118. Bit CR(11) of control register 118 is used to enable the serial input portion of serial port 100. If bit CR(11) of control register 118 is set to a "1" logic state, communication between receive registers RR0 and RR1 and external data bus D, via multiplexer 104, is enabled. Bit CR(11) of control register 118 in a "0" logic state, however, causes multiplexer 104 to select the output of stage FIFO0 as its output; in addition, a "0" logic state of bit CR(11) of control register 118, since it precludes the output of AND gate 152 from going to a "1" level, disables communication between receive registers RR0 and RR1 and external data bus D. In this manner, the user of microcomputer 110 can utilize encoder 108 and/or decoder 116 for companding data without necessarily using the serial input and output functions of serial port 100. By proper control of control register 118, data may be passed from external data bus D through demultiplexer 105, multiplexer 106, stage FIFO0, decoder 116, multiplexer 114 and back to external data bus D for u-law or A-law decoding, or from external data bus D through demultiplexer 105, encoder 108, multiplexer 106, stage FIFO0, multiplexers 104 and 114, and back to external data bus D for u-law or A-law encoding.

In the case of serial communications, however, bit CR(11) of control register 118 will be in its "1" logic state. The output of AND gate 152 is connected to the toggle input of T-type latch 154, and the reset input of T-type latch 154 is connected to signal $Q_{140}$, generated at the output of multiplexer 140 described above relative to FIG. 4. The Q output of T-type latch 154 is signal RD0, which in its high logic state causes multiplexer 104 to select the output of receive register RR0 for its output. The Q_ output of T-type latch 154 is signal RD1, which in its high logic state causes multiplexer 104 to select the output of receive register RR1 for its output. After a frame of data has been received, signal $Q_{140}$ (the output of multiplexer 140) makes a low-to-high transition, which will cause T-type latch 154 to reset its Q output to "0" and its Q_ output to "1". The first IN instruction to port address "1" after the framing signal $Q_{140}$ has gone to a high state (i.e., the first active DEN_ signal after latch 154 is reset) will provide a high level at the single-bit output of decode 150, causing T-type latch 154 to toggle its outputs so that its Q output is at a logic "1" and its Q_ output is at a logic "0". Accordingly, signal RD0 will cause multiplexer 104 to connect the output of receive register RR0 to the output of multiplexer 104 and accordingly, as described above, to external data bus D in either decoded or "undecoded" form. Upon the second IN instruction following the beginning of the framing pulse, the single-bit output of decode 150 will again go from a low to a high logic level, again toggling the toggle input of T-type latch 154, which will cause the Q output of latch 154 to go to a "0" level, and the Q_ output of latch 154 (signal RD1) to go to a "1" level. Accordingly, the second IN instruction in a frame will cause the contents of receive register RR1 to appear at the output of multiplexer 104, and thereby (either decoded or "undecoded") at external data bus D via multiplexer 114.

Since the framing pulse (the output of multiplexer 140) resets T-type latch 154, receipt of serial data from serial input terminal DR0 only, and not from serial input terminal DR1, can easily be performed by performing only a single IN instruction within each frame. In this way, the second IN instruction will not cause the toggle of T-type latch 154, and therefore the contents of receive register RR1 will not appear at the output of multiplexer 104, nor upon external data bus D.

Looking to the transmit side of serial port 100, as illustrated in FIG. 5, lines $D_S$ of external data bus D are connected to the input of demultiplexer 105, which is controlled by the three-bit output of decode 150 as discussed above. Demultiplexer 105 connects lines $D_S$ of external data bus D to control register 118 (lower word) responsive to port address RAp having the value of "0" during an OUT instruction, or (upper word) responsive to port address RAp having the value of "1" during an OUT instruction in combination with bit CR(8) of control register 118 being at a "1" logic state. Responsive to port address RAp having a "1" value in combination with bit CR(8) of control register 118 being at a "0" logic state, fourteen bits of lines $D_S$ will be connected to the input of encoder 108 and eight of lines $D_S$ will be connected to an input of multiplexer 106, when an OUT instruction is performed (i.e., signal WE_ of control bus 13 goes active). Encoder 108 performs the opposite function of decoder 116, relative to the companding of data according to the u-255 law and the A law, as discussed above relative to decoder 116. The output of encoder 108, eight bits wide, is connected to the other input of multiplexer 106. Similarly as decoder 116, bit CR(14) of control register 118 controls whether encoder 108 performs its function according to the u-255 law or the A-law. Bit CR(12) of control register 118 determines whether the output of multiplexer 106 corresponds to the output of encoder 108, or to the non-encoded data from lines $D_S$ of external data bus D. The output of multiplexer 106 is connected to the input of stage FIFO0. Multiplexer 106 connects the output of encoder 108 to the input of stage FIFO0 responsive to bit CR(12) of control register 118 being in its "1" state, and connects lines $D_S$ of external data bus D to the input of stage FIFO0 responsive to bit CR(12) of control register 118 being in its "0" state.

Whether encoded by encoder 108 or not, an OUT instruction to port address RAp of "1" (bit CR(8) equal to "1") will write data to stage FIFO0 of first-in first-out memory 110. The next such OUT instruction will also write eight bits of data to stage FIFO0, but the prior contents of stage FIFO0 will be loaded into stage FIFO1. The user of microcomputer 10 therefore is able to write data to multiple serial output channels (in this case, two) by performing successive OUT instructions to the same port address. Once stages FIFO0 and FIFO1 are loaded with the desired data, a framing pulse (either external or internal) will generate transmit register load signal SXLD, as discussed above relative to FIG. 4, for serial output via buffers 156 to serial output terminals DX0 and DX1 respectively, responsive to a series of pulses of serial clock signal SCLK. It should be noted that buffers 156 are disabled when bit CR(11) of control register 118 is in a "0" state; as discussed above, this also disables the serial receive portion of serial port 100, and allows the operation of the companding hardware without transmission and receipt of serial data.

Figure 6:
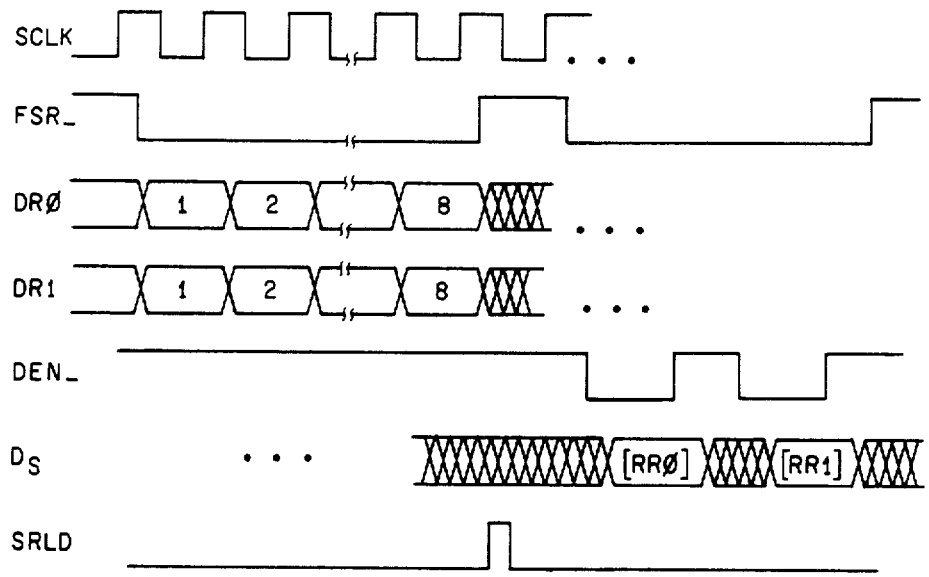
FIG. 6 is a timing diagram, illustrating the time-dependence of various electrical signals of the serial port in the microcomputer of FIGS. 2a through 2c in receiving serial input data.

Referring now to FIG. 6, an example of the timing of receipt of a frame of serial data by serial port 100, and communication of the received data to lines $D_S$ of external data bus D, is illustrated. FIG. 6 illustrates the case where external receive framing signal FSR__ is provided; it should be noted that operation is similar when internal framing signal FR is generated by the circuitry of FIG. 4, except that framing signal FR, which is used in place of external receive framing signal FSR__, will be of positive logic, and may have a duration of only a single cycle of serial clock signal SCLK. Internal framing signal FR controls the framing of both transmission of serial data and receipt of serial data; external framing signals FSR__ and FSX__ of course only control the framing for their respective receive and transmission operations. In addition, additional cycles of serial clock signal SCLK may occur between pulses of external receive framing signal FSR__ (or, in the case of internal framing, between pulses of framing signal FR); such additional pulses will not affect the operation of serial port 100. External receive framing signal FSR__ makes a negative transition at the beginning of a frame of data to be received on serial receive bus DR of FIG. 1, received by serial input terminals DR0 and DR1 of FIG. 2c. As discussed above, the high-to-low transition of external receive framing signal FSR__ will cause an interrupt (via master interrupt signal MIS); service of the interrupt will be accomplished by external data bus D of microcomputer 10 reading the serial data received, as explained below. Serial I/O peripheral 112 will then, via serial receive bus DR, apply the first bit of serial input data to serial input terminals DR0 and DR1 simultaneously. Receive shift registers RS0 and RS1 will, responsive to the falling edge of serial clock signal SCLK, receive the input data from serial input terminals DR0 and DR1 and shift it to the next serial position therewithin. Serial I/O peripheral 112 will apply the second serial input data bit to serial input terminals DR0 and DR1 prior to the falling edge of serial clock signal SCLK, at which time said second bit of serial input data is shifted into receive shift registers RS0 and RS1. This process continues until the eight data bits of the two serial input data bytes are applied to serial input terminals DR0 and DR1, and shifted into receive shift registers RS0 and RS1. At the end of the receipt of said eight data bits, external receive framing signal FSR__ is taken to its high logic state by serial I/O peripheral 112 (or such other device which is generating said signal), signifying the end of the frame of data.

As discussed above relative to FIG. 4, at such time as external receive framing signal FSR__ makes its low to high transition while serial clock signal SCLK is in a high state, edge detect 144 will generate receive register load signal SRLD. FIG. 6 illustrates the time at which receive register load signal SRLD is generated after the receipt of the frame of input data. Responsive to receive register load signal SRLD going to its high state, the contents of receive shift registers RS0 and RS1 are loaded into receive registers RR0 and RR1. A second cycle of external receive framing signal FSR__ then begins, as shown in FIG. 6; the next frame of data (not shown) may then be applied to serial input terminals DR0 and DR1 as in the first cycle of external receive framing signal FSR__ illustrated in FIG. 6.

In order to communicate the serial input data from receive registers RR0 and RR1 onto external data bus D, and thereby to the remainder of microcomputer 10, microcomputer 10 must execute a pair of IN instructions after external receive framing signal FSR__ has gone high. Latch 154 is reset upon the rising edge of external receive framing signal FSR__ (i.e., the rising edge of the output of multiplexer 140). It should be noted that in the event that internal framing control is used, latch 154 is reset at the end of the frame since the output of multiplexer 140 will be the long framing signal $Q_{136}$, instead of external receive framing signal FSR__. Even if bit CR(28) of control register 118 selects output of the short framing signal via multiplexer 138, the long framing signal $Q_{136}$ is used in the control of latch 154.

To read the serial data from receive registers RR0 and RR1, the IN instructions must be executed with port address RAp having a value of "1" (addressing serial port 100), bit CR(8) of control register 118 being at a "0" logic state, and bit CR(11) of control register 118 being at a "1" logic state. In addition, as discussed above, execution of the IN instruction will cause an active pulse of signal DEN__ (active low). Responsive to the first active pulse of signal DEN__ after the rising edge of external framing signal FSR__ (and reset of latch 154), with serial port 100 addressed and the contents of control register 118 being in the above state, multiplexer 104 (via multiplexer 114 controlled by decode 150 to select either decoded or not decoded data) will communicate the contents of receive register RR0 to lines $D_S$ of external data bus D, as shown in FIG. 6. Responsive to the second active pulse of signal DEN__ after the reset of latch 154, the contents of receive register RR1 will be similarly be communicated to lines $D_S$, as shown in FIG. 6, completing the communication of the serial data from both serial input channels to the data bus of microcomputer 10. It should be noted that single-receive channel operation can be effected by performing only a single IN instruction after reset of latch 154, thereby ignoring the contents of receive register RR1. After the reading of the contents of receive registers RR0 and RR1, the interrupt flag bit CR(1) of control register 118 may be reset to a "0" state, to await the next frame of data.

It should also be noted, of course, that lines $D_S$ are not necessarily idle during such time that serial data is being clocked in at serial input terminals DR0 and DR1. Indeed, the execution of IN instructions may occur during the receipt of data by serial input terminals DR0 and DR1, since receive shift registers RS0 and RS1 are isolated from the receive registers RR0 and RR1 except during the active portion of receive register load signal SRLD. Indeed, the execution of IN instructions during the receipt of the next bytes of serial data provides the best performance of serial port 100. Such a condition is suggested in FIG. 6 by external receive framing signal FSR__ making a high-to-low transition prior to the active pulses of signal DEN__; this is of no effect for the reading of serial data from receive registers RR0 and RR1, but allows the next frame of data to be received by receive shift registers RS0 and RS1 during the read of receive registers RR0 and RR1.

In the above-described example, port address RAp requires only the address value of "1" for communication with both serial input terminals DR0 and DR1 via receive registers RR0 and RR1. Such communication results from the feature that the contents of receive registers RR0 and RR1 are sequentially presented to lines $D_S$ of external data bus D. Accordingly, it should be apparent that serial data may be received from more than two serial input terminals, all of said terminals being associated with only a single port address.

Figure 7:
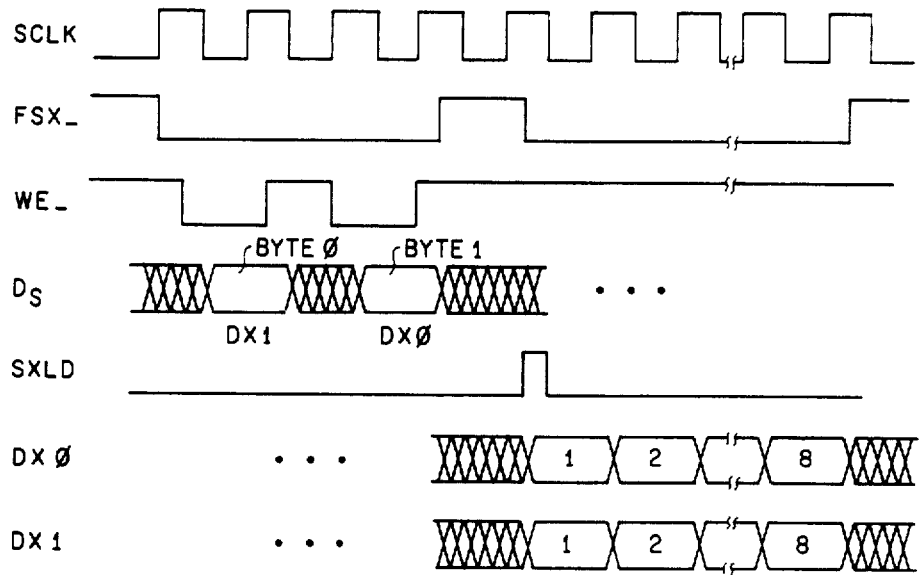
FIG. 7 is a timing diagram, illustrating the time-dependence of various electrical signals of the serial port in the microcomputer of FIGS. 2a through 2c in transmitting serial data.

Referring now to FIG. 7, the timing of the operation of the transmission of a frame of serial data by serial port 100 will be illustrated, again assuming that framing is controlled by external transmit framing signal FSX_. Similarly as in the case of serial data input to microcomputer 10, internal framing signal FR may be used, either in its long (eight cycle of serial clock signal SCLK) or short (first cycle of serial clock signal SCLK) form. In addition, it should further be noted that the receipt of data by receive shift registers RS0 and RS1 can occur simultaneously with the transmission of data by transmit registers TR0 and TR1, responsive to the same pulses of serial clock signal SCLK and, in the case of internal framing control, to the same pulses of framing signal FR. Of course, in this embodiment of the invention, the execution of IN and OUT instructions cannot occur simultaneously, due to the data conflict which would occur on lines $D_s$ of external data bus D.

Beginning at the left side of FIG. 7, external transmit framing signal FSX_ makes a high-to-low transition. During this first framing pulse, microcomputer 10, as discussed above, can load both stages of first-in first-out memory 110 by executing two OUT instructions. Again similarly as in the case of receiving serial data, the OUT instruction must be executed with port address RAp having a value of "1", with bit CR(8) of control register 118 being at a "0" logic state, and with bit CR(11) of control register 118 being at a "1" logic state. The first such OUT instruction during the first active framing signal, will cause signal WE_ of control bus 13 to go to its active low state. During this time, presuming that serial port 100 is addressed and enabled by control register 118 being in the above condition, the data on lines $D_s$ of external data bus D, for purposes of this explanation designated as BYTE 0, will be loaded into stage FIFO0. During the second OUT instruction during the first active framing signal, signal WE_ will again go into its active low state, and the data on lines $D_s$ of external data bus D (BYTE 1) will be loaded into stage FIFO0. As discussed above, each time that stage FIFO0 is loaded with data, the previous contents of stage FIFO0 are loaded into stage FIFO1. Accordingly, after the execution of the two OUT instructions during the first active framing signal, stage FIFO1 will contain BYTE 0, and stage FIFO0 will contain BYTE 1. External transmit framing signal FSX_ will then be reset to its high state.

Upon the next high-to-low transition of external transmit framing signal FSX_ which, in the illustrated example, occurs during serial clock signal SCLK being at a high logic level, edge detector 146 (of FIG. 4) will generate transmit register load signal SXLD. Transmit register load signal SXLD, as discussed above, causes transmit registers TR0 and TR1 to be loaded with the contents of stages FIFO0 and FIFO1, respectively. In the illustrated example of FIG. 7, BYTE 0 will be stored in transmit register TR1, and BYTE 1 will be stored in transmit register TR0, responsive to transmit register load signal SXLD. Subsequent to their loading, transmit registers TR0 and TR1 begin serial output of their new contents at serial output terminals DX0 and DX1, beginning with the first bit. Responsive to the first eight pulses of serial clock signal SCLK after the active pulse of external transmit framing signal FSX_, all eight bits of BYTE 0 are serially output at serial output terminal DX1, and all eight bits of BYTE 1 are serially output at serial output terminal DX0.

Similarly as in the example of the serial input terminals DR0 and DR1, port address RAp requires only the address value of "1" for communication with both serial output terminals DX0 and DX1 via transmit registers TR0 and TR1. Such communication results from the capability of first-in first-out memory 110 to receive a sequence of data words from lines $D_s$ of external data bus D, with subsequent communication of such data to transmit registers TR0 and TR1. Accordingly, it should be apparent that serial data may be transmitted from more than two serial output terminals, all of said terminals being associated with only a single port address.

Further description of microcomputer 10, especially as it relates to the instruction set, system timing, and to the construction of the various component elements of microcomputer 10 is disclosed in the above-referenced U.S. Pat. No. 4,577,282. The portions of U.S. Pat. No. 4,577,282 not expressly restated in this specification are incorporated herein by this reference.

Although the invention has been described in detail herein with reference to its preferred embodiment, it is to be understood that this description is by way of example only, and is not to be construed in a limiting sense. It is to be further understood that numerous changes in the details of the embodiment of the invention, and additional embodiments of the invention, will be apparent to, and may be made by, persons of ordinary skill in the art without departing from the scope and spirit of the invention.

TABLE 1

| Control Register Bit Definitions | | |
|---|---|---|
| CR BIT # | Description | |
| 0–3 | Interrupt flags. When an interrupt occurs on any of the four interrupts, the appropriate flag is set to logic 1 whether the interrupt is enabled or disabled. | |
| | Bit # | Flag |
| | 0 | INT_ |
| | 1 | FSR_ |
| | 2 | FSX_ |
| | 3 | $Q_{136}$ |
| 4–7 | Interrupt enable bits. When set to logic 1 the corresponding interrupt is enabled | |
| | Bit # | Flag |
| | 4 | INT_ |
| | 5 | FSR_ |
| | 6 | FSX_ |
| | 7 | $Q_{136}$ |
| 8 | Port 1 control bit. When set to logic 0, port 1 enables serial port or compander (see CR(11)). When set to logic 1, port 1 | |

TABLE 1-continued

Control Register Bit Definitions

| | |
|---|---|
| | communicates with control register 118. |
| 9 | External framing enable. When set to logic 0, serial-port transmit and receive operations occur simultaneously and are controlled by the internal framing (FR) pulse. When set to logic 1, transmit operations are controlled by the external framing pulses. |
| 10 | XF output latch. |
| 11 | Serial-port enable. When set to logic 0, the transmit and receive registers are disabled. When set to logic 1, the serial-port registers are enabled. |
| 12 | u-law/A-law encoder enable. When set to logic 0, the encoder is disabled. When set to logic 1, the encoder is enabled. |
| CR BIT # | Description |
| 13 | u-law/A-law decoder enable. When set to logic 0, the decoder is disabled. When set to logic 1, the decoder is enabled. |
| 14 | u-law or A-law select. When set to logic 0, the companding hardware performs u-255-law conversion. When set to logic 1, the companding hardware performs A-law conversion. |
| 15 | Serial-clock control. When set to logic 0, the serial-port clock (SCLK) is an output, derived from the microcomputer system clock. When set to logic 1, SCLK is an input to the device. |
| 16-23 | FR frequency control. The value of these bits determines the divide ratio for the FR output frequency. |
| 24-27 | SCLK prescale divide-ratio control. |
| 28 | FR pulse-width control. When set to logic 0, FR is one SCLK cycle wide and appears in the serial-clock cycle preceding the first serial-bit transmission. When set to logic 1, FR is eight SCLK cycles wide and is active high for the duration of the eight bits transmitted and received. |

We claim:

1. A multi-channel serial output circuit associated with a microprocessor for communicating a first data word and a second data word from a data bus to a serial output, said circuit comprising:

means, addressable by said microprocessor and connected to a data bus of said microprocessor, for storing a first data word and a second data word, said first and said second data words being sequentially presented on said data bus by said microprocessor;

a first output register, said first output register having a serial output connected to a first serial output terminal of said microprocessor, said first output register connected to said storing means so that it can be loaded with said first data word;

a second output register, said second output register having a serial output connected to a second serial output terminal of said microprocessor, said second output register connected to said storing means so that it can be loaded with said second data word; and synchronization means, responsive to a clock signal of said microprocessor, for controlling the shifting of said data words to said storing means, and for controlling the shifting of data to the input and through the output of said first and said second output registers and to said first and second output terminals, such that said first and second output terminals may be addressed by said microprocessor by utilizing a single address.

2. The circuit of claim 1, wherein said storing means comprises:

a memory having a first stage and a second stage, said second stage connected to said first stage so that the data stored by said first stage is written into said second stage responsive to said first stage storing a new word of data, said memory having an input connected to said first stage, said memory having a first output connected to said first stage and a second output connected to said second stage; and decode logic, connected to an address bus of said microprocessor, said decode logic connecting said input of said memory to said data bus of said microprocessor responsive to an address signal on said address bus which corresponds to said serial output circuit.

3. The circuit of claim 2, further comprising:

an encoder having an input and having an output; and multiplexer means, having a first data input connected to said output of said encoder, having a second data input and a control input, and having an output connected to said input of said memory;

wherein said decode logic connects said input of said encoder and said second input of said multiplexer to said data bus responsive to said corresponding address signal;

and further comprising control means, connected to said control input of said multiplexer, for selecting either encoded data or non-encoded data to be stored by said memory.

4. The circuit of claim 1, wherein said synchronization means comprises:

framing means, connected to the system clock of said microprocessor, for generating a framing signal, said framing signal having a pulse associated with the first of a predetermined number of serial data bits;

clocking means, connected to the system clock of said microprocessor, for generating a serial clock signal, said serial clock signal having a pulse associated with each serial data bit; and output register load means, connected to said framing means and to said first and said second output registers, for loading said first and said second output registers with said first and said second data words stored by said storing means responsive to a framing signal;

wherein said first and said second output registers are connected to said clocking means so that said first and said second output registers each present a series of data bits at said first and said second serial output terminals, respectively, responsive to a series of pulses of said serial clock signal.

5. A multi-channel serial input circuit associated with a microprocessor for communicating a first data word and a second data word from a serial input to a data bus, said circuit comprising:
- a first input register having an input connected to a first serial input terminal of said microprocessor, and having an output;
- a second input register having an input connected to a second serial input terminal of said microprocessor, and having an output;
- first and second receive registers for receiving data words from said input registers, said first receive register connected to said first input register, and said second receive register connected to said second input register;
- a first multiplexing means connected to an output of said first and second receive registers, for selecting either a first data word received by said first receive register or a second data word received by said second receive register; and
- synchronization means connected to said multiplexing means for utilizing a single address with both said first and second input terminals.

6. The circuit of claim 5, and further including:
- decode logic, connected to an address bus of said microprocessor and to a control input of said first multiplexing means, said decode logic controlling said first multiplexing means for sequentially connecting the output of said first input register and the output of said second input register to said data bus of said microprocessor, responsive to an address signal on said address bus which corresponds to said serial input circuit.

7. The circuit of claim 5 wherein said synchronization means comprises:
- framing means, connected to the system clock of said microprocessor, for generating a framing signal, said framing signal having a pulse associated with the last of a predetermined number of serial data bits; and
- clocking means, connected to the system clock of said microprocessor, for generating a serial clock signal, said serial clock signal having a pulse associated with each serial data bit;
- wherein said first and said second input registers are connected to said clocking means so that said first and said second input registers accept a series of data bits applied to said first and said second serial input terminals, responsive to a series of pulses of serial clock signals generated by said clocking means.

8. The circuit of claim 7, wherein said framing means is connected to a framing signal terminal, and
wherein said clocking means is connected to a serial clock terminal, so that a device connected to said serial input terminals, said framing signal terminal, and said serial clock terminal can synchronize itself with said framing signal and said serial clock signal.

9. The circuit of claim 8, wherein said framing means also is for receiving a framing signal applied to said framing signal terminal;
wherein said clocking means also is for receiving a framing signal applied to said serial clock terminal;
and further comprising control means, connected to said framing means and said clocking means, for selecting whether said framing means and said clocking means generate said framing signal and said serial clock signal, respectively, or are responsive to a framing signal and a serial clock signal applied to said framing signal terminal and said serial clock terminal, respectively.

10. The circuit of claim 5, further comprising:
- a decoder having an input and having an output, said input of said decoder being connected to said output of said first multiplexing means;
- a second multiplexing means having a first input connected to said output of said first multiplexing means, having a second input connected to said output of said decoder, having a control input, and having an output connected to said data bus; and
- control means, connected to said control input of said second multiplexing means, for selecting either decoded or non-decoded data to be applied by said second multiplexing means to said data bus.

11. A multi-channel serial input/output circuit associated with a microprocessor for communicating a first data word and a second data word to and from a serial input, said circuit comprising:
- means, addressable by said microprocessor and connected to a data bus of said microprocessor, for storing a first data word and a second data word, said first and said second data words being sequentially presented on said data bus by said microprocessor;
- a first output register, said first output register having a serial output connected to a first serial output terminal of said microprocessor, said first output register connected to said storing means so that it can be loaded with said first data word;
- a second output register, said second output register having a serial output connected to a second serial output terminal of said microprocessor, said second output register connected to said storing means so that it can be loaded with said second data word;
- a first synchronization circuit, responsive to a clock signal of said microprocessor, for controlling the shifting of said data words to said storing means, and for controlling the shifting of data to the input and through the output of said first and said second output registers and to said first and second output terminals, such that said first and second output terminals may be addressed by said microprocessor by utilizing a single address;
- a first input register having an input connected to a first serial input terminal of said microprocessor, and having an output;
- a second input register having an input connected to a second serial input terminal of said microprocessor, and having an output;
- first and second receive registers for receiving data words from said input registers, said first receive register connected to said first input register, and said second receive register connected to said second input register;
- a first multiplexer connected to an output of said first and second receive registers, for selecting either a first data word received by said first receive register or a second data word received by said second receive register; and
- a second synchronization circuit connected to said multiplexer for utilizing a single address with both said first and second input terminals.

* * * * *